(12) United States Patent
Chen et al.

(10) Patent No.: US 11,924,129 B2
(45) Date of Patent: Mar. 5, 2024

(54) SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Wenhong Chen, Dongguan (CN); Yun Fang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 351 days.

(21) Appl. No.: 17/393,322

(22) Filed: Aug. 3, 2021

(65) Prior Publication Data

US 2021/0367730 A1   Nov. 25, 2021

Related U.S. Application Data

(63) Continuation of application No. PCT/CN2019/074705, filed on Feb. 3, 2019.

(51) Int. Cl.
*H04W 72/1268* (2023.01)
*H04L 5/00* (2006.01)

(52) U.S. Cl.
CPC ....... *H04L 5/0048* (2013.01); *H04W 72/1268* (2013.01)

(58) Field of Classification Search
CPC ... H04L 5/0044; H04L 5/0048; H04L 5/0051; H04L 5/0094; H04W 72/1268
See application file for complete search history.

(56) References Cited

U.S. PATENT DOCUMENTS

2020/0389885 A1* 12/2020 Tomeba ................ H04W 72/21
2021/0058274 A1*  2/2021 Osawa ................. H04B 7/0456
(Continued)

FOREIGN PATENT DOCUMENTS

CN    108809578 A    11/2018
CN    109151973 A     1/2019
(Continued)

OTHER PUBLICATIONS

International Search Report issued in corresponding International Application No. PCT/CN2019/074705, dated Oct. 24, 2019, 35 pages.
(Continued)

*Primary Examiner* — Syed Ali
(74) *Attorney, Agent, or Firm* — BAYES PLLC

(57) ABSTRACT

Embodiments of the present disclosure disclose a signal transmission method, a terminal device and a network device. The method includes a terminal device determining, according to a sounding reference signal resource indication (SRI) in scheduling information, a plurality of sounding reference signal (SRS) resources or a plurality of SRS resource groups, wherein the scheduling information is used to schedule a plurality of physical uplink shared channels (PUSCH), and the plurality of SRS resources or the plurality of SRS resource groups correspond to the plurality of PUSCHs; and the terminal device determining, according to the plurality of SRS resources or the plurality of SRS resource groups, transmission parameters of the plurality of PUSCHs. The method, the terminal device and the network device in the embodiments of the present disclosure help to achieve the purpose of improving transmission reliability in repeated PUSCH transmissions.

16 Claims, 7 Drawing Sheets

(56) References Cited

U.S. PATENT DOCUMENTS

| | | | | |
|---|---|---|---|---|
| 2021/0184819 A1* | 6/2021 | Takeda | ............... | H04W 24/10 |
| 2021/0345253 A1* | 11/2021 | Matsumura | ......... | H04W 52/262 |
| 2021/0367655 A1* | 11/2021 | Jiang | ............... | H04B 7/0639 |
| 2022/0039122 A1* | 2/2022 | Park | ............... | H04W 72/1268 |
| 2022/0070855 A1* | 3/2022 | Zhang | ............... | H04W 72/51 |
| 2022/0078718 A1* | 3/2022 | Hoshino | ............ | H04W 72/02 |

FOREIGN PATENT DOCUMENTS

| | | |
|---|---|---|
| CN | 109167621 A | 1/2019 |
| WO | 2018231141 A1 | 12/2018 |

OTHER PUBLICATIONS

PCT Written Opinion of the International Searching Authority issued in corresponding International Application No. PCT/CN2019/074705 dated Oct. 24, 2019, 9 pages.

Extended European Search Report issued in corresponding European Application No. 19914090.6, dated Dec. 1, 2021, 11 pages.

"Layer 1 enhancements for NR URLLC", Agenda Item: 7.2.6.2, Source NTT Docomo, Inc., 3GPP TSG RAN WG1 Meeting #94bis, R1-1811378, Chengdu, China, Oct. 8-12, 2018, 18 pages.

First Office action issued in correspoding India Application No. 202127035903, dated Apr. 11, 2022, 7 pages.

Communication pursuant to Article 94(3) EPC issued in corresponding European Application No. 19914090.6, dated Oct. 17, 2023, 6 pages.

* cited by examiner

200

A terminal device determinines, according to a sounding reference signal resource indicator (SRI) in scheduling information, a plurality of sounding reference signal (SRS) resources or a plurality of SRS resource sets, wherein the scheduling information is used to schedule a plurality of physical uplink shared channels (PUSCH), and the plurality of SRS resources or the plurality of SRS resource sets are corresponding to the plurality of PUSCHs — S210

The terminal device determinines, according to the plurality of SRS resources or the plurality of SRS resource sets, transmission parameters of the plurality of PUSCHs — S220

Network device determines scheduling information based on a plurality of Sounding Reference Signal (SRS) resources or a plurality of SRS resource groups, where the scheduling information is used for scheduling a plurality of Physical Uplink Shared Channels (PUSCH), and the plurality of PUSCHs are corresponding to the plurality of SRS resources or the plurality of SRS resource groups — S310

The network device sends the scheduling information to a terminal device, where a Sounding Reference Signal Indicator (SRI) in the scheduling information is used for indicating the plurality of SRS resources or the plurality of SRS resource groups — S320

Fig. 8

SIGNAL TRANSMISSION METHOD, TERMINAL DEVICE, AND NETWORK DEVICE

CROSS-REFERENCE TO RELATED APPLICATION

This application is a continuation of International Application No. PCT/CN2019/074705, filed on Feb. 3, 2019, the entire contents of which are incorporated herein by reference.

BACKGROUND

The embodiment of the present disclosure relates to the field of communication technology, and particularly, to a signal transmission method, a terminal device and a network device.

In order to improve the transmission reliability of Physical Uplink Shared Channel (PUSCH), the New Radio (NR) introduces repeat transmission of PUSCH, that is, one piece of scheduling information may schedule a plurality of PUSCHs.

In related arts, a Sounding Reference Signal (SRS) resource may be indicated by a network device to a terminal device through a Sounding Reference Signal Resource Indicator (SRI) in the scheduling information, so as to obtain a transmission parameter of a PUSCH. For example, for codebook-based PUSCH transmission, the SRI indicates one SRS resource in one SRS resource set; and for non-codebook-based PUSCH transmission, the SRI indicates one or more SRS resources in one SRS resource set, the one or more SRS resources corresponding to different transmission layers of the same PUSCH. The current solution may lead to that the terminal device cannot achieve the purpose of improving transmission reliability in the repeat transmission of PUSCH.

SUMMARY

The embodiment of the present disclosure provides a signal transmission method, a terminal device and a network device, which are beneficial to improve the transmission reliability in the repeat transmission of PUSCH.

In a first aspect, there is provided a signal transmission method, including determining, by a terminal device, a plurality of Sounding Reference Signal (SRS) resources or a plurality of SRS resource groups based on a Sounding Reference Signal Resource Indicator (SRI) in scheduling information, where the scheduling information is used for scheduling a plurality of Physical Uplink Shared Channels (PUSCH), and the plurality of SRS resources or the plurality of SRS resource groups are corresponding to the plurality of PUSCHs; and determining, by the terminal device, a transmission parameter of the plurality of PUSCHs based on the plurality of SRS resources or the plurality of SRS resource groups. It is beneficial to achieve the purpose of improving the transmission reliability in the repeat transmission of PUSCH.

In a second aspect, there is provided a signal transmission method, including determining, by a network device, scheduling information based on a plurality of Sounding Reference Signal (SRS) resources or a plurality of SRS resource groups, where the scheduling information is used for scheduling a plurality of Physical Uplink Shared Channels (PUSCH), and the plurality of PUSCHs are corresponding to the plurality of SRS resources or the plurality of SRS resource groups; and sending, by the network device, the scheduling information to a terminal device, where a Sounding Reference Signal Indicator (SRI) in the scheduling information is used for indicating the plurality of SRS resources or the plurality of SRS resource groups.

In a third aspect, there is provided a terminal device for performing the method in the first aspect or each implementation thereof.

Specifically, the terminal device includes a functional module for performing the method in the first aspect or each implementation thereof.

In a fourth aspect, there is provided a network device, including a processor and a memory. The memory is configured to store a computer program, and the processor is configured to call and run the computer program stored in the memory to perform the method in the first aspect or each implementation thereof.

In a fifth aspect, there is provided a chip for implementing the method in any one of the first aspect to the second aspect or each implementation thereof.

Specifically, the chip includes a processor, configured to call and run a computer program from a memory, so that a device installed with the chip performs the method in any one of the first aspect to the second aspect or each implementation thereof.

In a sixth aspect, there is provided a computer-readable storage medium, where the computer-readable storage medium is configured to store a computer program that enables a computer to perform the method in any one of the first aspect to the second aspect or each implementation thereof.

In a seventh aspect, there is provided a computer program product, where the computer program product includes a computer program instruction that enables a computer to perform the method in any one of the first aspect to the second aspect or each implementation thereof.

In an eighth aspect, there is provided a computer program, which when running on a computer, enables the computer to perform the method in any one of the first aspect to the second aspect or each implementation thereof.

Through the above technical solutions, the terminal device may determine a plurality of SRS resources or a plurality of SRS resource groups based on an SRI in scheduling information, then the terminal device may determine transmission parameters of a plurality of PUSCHs scheduled by the scheduling information based on the plurality of SRS resources or the plurality of SRS resource groups, so that the plurality of PUSCHs can be transmitted based on different transmission parameters, which is beneficial to achieve the purpose of improving the transmission reliability in the repeat transmission of PUSCH.

BRIEF DESCRIPTION OF THE DRAWINGS

FIG. 7 is a schematic diagram of a signal transmission method provided by the embodiment of the present disclosure.

FIG. 8 is another schematic diagram of the signal transmission method provided by the embodiment of the present disclosure.

DETAILED DESCRIPTION

The technical solutions in the embodiments of the present disclosure will be described below in conjunction with the drawings in the embodiments of the present disclosure. Obviously, the described embodiments are part of the embodiments of the present disclosure, rather than all of them. Based on the embodiments in the present disclosure, all the other embodiments obtained by those of ordinary skill in the art without creative work fall within the protection scope of the present disclosure.

It should be understand that the technical solutions in the embodiments of the present disclosure may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, a New Radio (NR) or a future 5G system, etc.

In particular, the technical solutions of the embodiments of the present disclosure may be applied to various communication systems based on non-orthogonal multiple access technology, such as a Sparse Code Multiple Access (SCMA) system, a Low Density Signature (LDS) system, etc. The SCMA system and the LDS system may also be referred to as other names in the communication field. Furthermore, the technical solutions of the embodiments of the present disclosure may be applied to a multi-carrier transmission system using non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system, a Filtered Orthogonal Frequency Division Multiplexing (Filtered-OFDM, F-OFDM) system, and the like using non-orthogonal multiple access technology.

Figure 1:
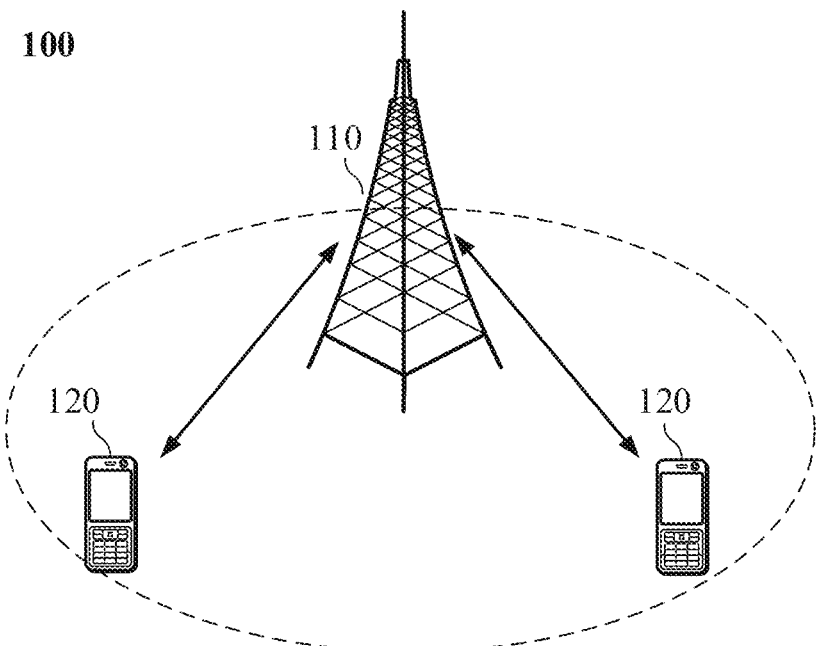
FIG. 1 is a schematic diagram of a communication system architecture provided by the embodiment of the present disclosure.

Exemplarily, a communication system 100 applied in the embodiments of the present disclosure is shown in FIG. 1. The communication system 100 may include a network device 110 which may be a device that communicates with a terminal device 120 (or referred to as a communication terminal or a terminal). The network device 110 may provide communication coverage for a specific geographic area, and communicate with the terminal device located within the coverage area. Optionally, the network device 110 may be a Base Transceiver Station (BTS) in a GSM system or a CDMA system, and may also be a NodeB (NB) in a WCDMA system, and may also be an Evolutional Node B (eNB or eNodeB) in an LTE system, or a wireless controller in a Cloud Radio Access Network (CRAN), or the network device may be a mobile switching center, a relay station, an access point, an in-vehicle device, a wearable device, a hub, a switch, a bridge, a router, a network device gNB in a 5G network or a network device in the future evolved Public Land Mobile Network (PLMN), etc.

The communication system 100 also includes at least one terminal 120 located within the coverage area of the network device 110. The "terminal device" used herein includes, but is not limited to, a User Equipment (UE), an access terminal, a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, a terminal device in a future 5G network or a terminal device in the future evolved Public Land Mobile Network (PLMN), etc., which is not limited by the embodiments of the present disclosure.

Optionally, Device to Device (D2D) communication may be performed between the terminal devices 120.

Optionally, the 5G system or 5G network may also be referred to as a New Radio (NR) system or NR network.

FIG. 1 exemplarily illustrates one network device and two terminal devices. Optionally, the communication system 100 may include a plurality of network devices, and the coverage area of each network device may include other numbers of terminal devices, which is not limited by the embodiments of the present disclosure.

Optionally, the communication system 100 may also include other network entities such as a network controller, a mobile management entity, etc., which is not limited by the embodiments of the present disclosure.

It should be understood that a device with communication function in the network/system in the embodiments of the present disclosure may be referred to as a communication device. Taking the communication system 100 shown in FIG. 1 as an example, the communication device may include a network device 110 and a terminal device 120 with communication function, and the network device 110 and the terminal device 120 may be the specific devices described above, which will not be elaborated here; and the communication device may also include other devices in the communication system 100, such as other network entities such as a network controller, a mobile management entity, etc., which is not limited by the embodiments of the present disclosure.

It should be understood that the terms "system" and "network" are often used interchangeably herein. The term "and/or" herein is only to describe a kind of association relationship among associated objects, and means that there may be three kinds of relationships. For example, A and/or B may mean that there are the following three cases: A exists alone, A and B exist at the same time, and B exists alone. In addition, the character "/" herein generally indicates that the associated objects are in an "or" relationship.

When a terminal device sends a PUSCH, it needs to perform precoding processing on uplink data to obtain an uplink precoding gain. The precoding processing is generally divided into two parts: analog domain processing and digital domain processing. The analog domain processing aims at a sent analog signal, and generally maps a Radio Frequency (RF) signal to a physical antenna by using beamforming. The digital domain processing aims at a digital signal, is generally carried out on a baseband, precodes the digital signal by using a precoding matrix, and maps data of a transmission layer to a RF port. Due to the limited number of RF channel of the terminal device, the two processing modes are usually used at the same time, that is, the digital signal is precoded, and then the analog signal is shaped by using beams. PUSCH transmission is divided into codebook-based transmission and non-codebook-based transmission based on different precoding modes.

Figure 2:
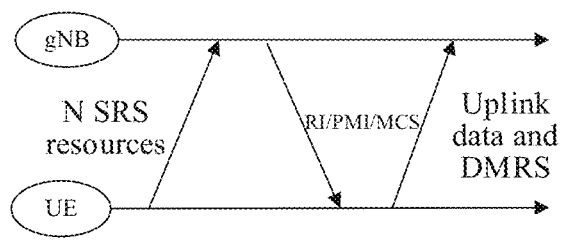
FIG. 2 shows a schematic diagram of a process of codebook-based PUSCH transmission.

As shown in FIG. 2, in the uplink codebook-based precoding mode, the gNB may configure for the UE device an SRS resource set dedicated to codebook transmission. The UE may send an SRS on a plurality of SRS resources in the set, and the SRS on each SRS resource may be sent by using different beams. The gNB selects the best SRS resource from the sent SRSs to obtain Channel State Information (CSI), and indicates a resource index to the UE through an SRS Resource Indicator (SRI) at the same time, so as to make the UE use the beam corresponding to the SRS resource to perform analog beamforming. At the same time, the gNB may indicate a Rank Indicator (RI), a Precoding Matrix Indicator (PMI) and a Modulation and Coding Scheme (MCS) through Downlink control information (DCI), and based on the RI and the PMI, the UE may determine the uplink precoding matrix corresponding to the PMI from the codebook, thereby the UE may perform uplink data and Demodulation Reference Signal (DMRS) based on the determined precoding matrix.

Figure 3:
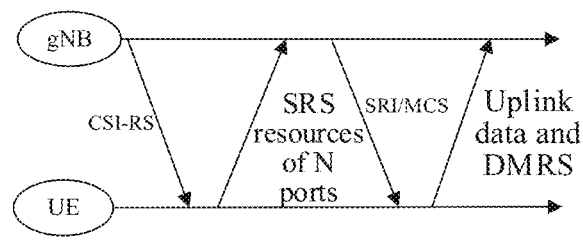
FIG. 3 shows a schematic diagram of a process of non-codebook-based PUSCH transmission.

For some UEs which support the reciprocity of uplink and downlink channels, the non-codebook-based precoding mode may also be supported. As shown in FIG. 3, the UE may use downlink channel information to obtain uplink channel information, so as to perform uplink analog beamforming and/or digital precoding. At this time, the gNB does not need to indicate the relevant information of the precoding matrix, thereby reducing the overhead of DCI. Specifically, the gNB first sends a CSI-RS, so as to make UE determine a beam and a precoding matrix of N layers based on the Channel State Information Reference Signal (CSI-RS). The UE uses the beam and the precoding matrix of the N layers to send SRS resources of N single ports (i.e. N SRS ports), and these N SRS resources are configured as one SRS resource set for non-codebook-based transmission. After receiving the SRS resources, the gNB measures them, and selects the best K SRS resources, and indicates the corresponding SRI and MCS to the UE. The UE determines the adopted transmission parameters based on the SRI, such as a number of transmission layer, a precoding matrix and an analog beam. The number of the SRS resource indicated is the number of transmission layer, and the precoding matrix and the analog beam used by the corresponding SRS resource are the precoding matrix and the beam used by the corresponding layer of data. At this time, there is no need to indicate the RI and the PMI in the DCI. Therefore, the UE may perform uplink data and Demodulation Reference Signal (DMRS) based on the determined precoding matrix.

Figure 4:
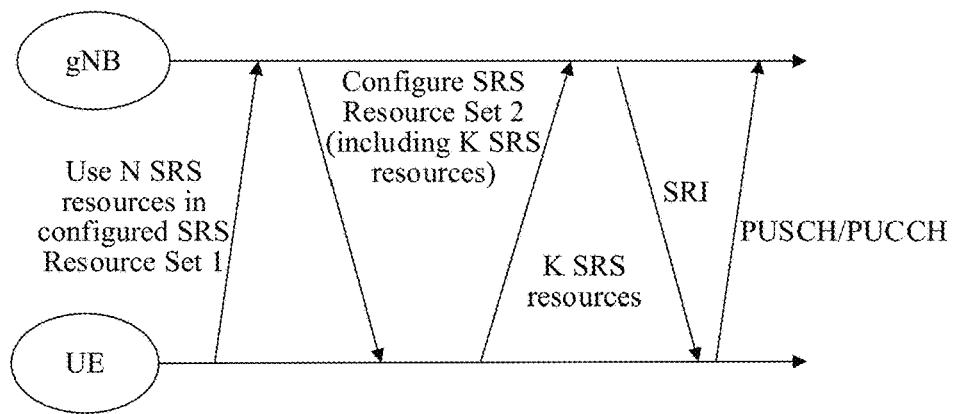
FIG. 4 shows a schematic diagram of a process of uplink beam management.

In NR, the UE may use an analog beam to transmit uplink data and uplink control information. The UE may perform uplink beam management based on an SRS signal, so as to determine an analog beam used for uplink transmission. Specifically, as shown in FIG. 4, the network may configure for the UE an SRS Resource Set 1, which includes N SRS resources (N>1). The UE may use different beams to send the N SRS resources, and the gNB measures the receiving quality of the N SRS resources respectively, and selects K SRS resources with the best receiving quality. The gNB may configure another SRS Resource Set 2 including K SRS resources, and make the UE use the analog beams used by the K SRS resources which are selected from the Set 1, to transmit the SRS resources in the Set 2. This may be achieved by configuring the K SRS resources selected from the Set 1 as the reference SRS resources of the K SRS resources in the Set 2, respectively. At this time, based on the SRS transmitted by the UE in SRS Resource Set 2, the gNB may select one SRS resource with the best receiving quality, and inform the UE of the corresponding SRI. After receiving the SRI, the UE determines the analog beam used by the SRS resource indicated by the SRI as the analog beam used for PUSCH/Physical Uplink Control Channel (PUCCH) transmission. For PUSCH, the SRI is indicated by an SRI indication field in DCI. For PUCCH, PUCCH-spatialrelationinfo corresponding to each PUCCH resource is configured in RRC signaling, and the information field may include the SRI.

In NR, the terminal device may determine a transmission parameter of a scheduled PUSCH based on an SRI in DCI. For example, the terminal device may determine a transmit beam of the scheduled PUSCH based on the SRI in the DCI, and also determine a power control parameter used by the PUSCH based on the SRI.

Figure 5:
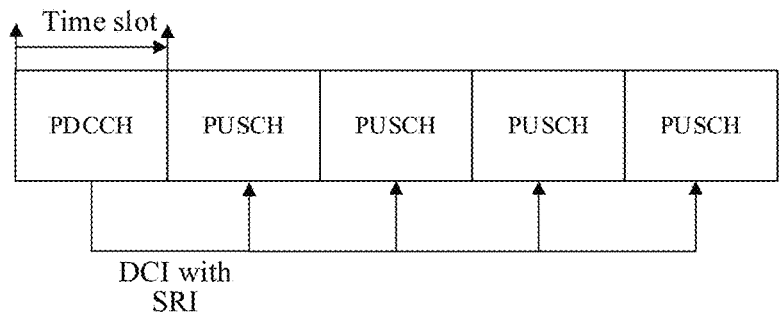
FIG. 5 shows a schematic diagram of PUSCH repeat transmission based on a slot.
Figure 6:
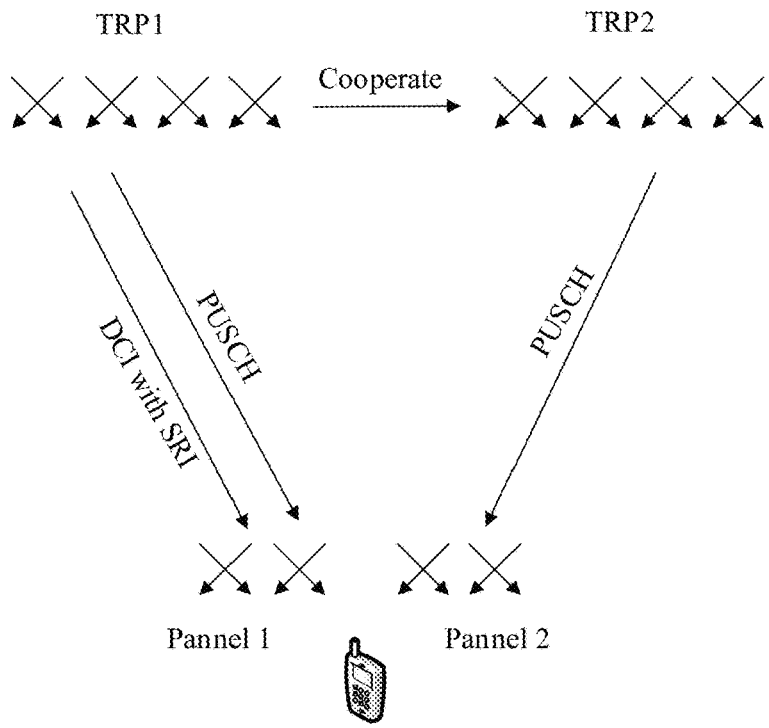
FIG. 6 shows a schematic diagram of PUSCH repeat transmission based on an antenna panel.

In order to improve the transmission reliability of PUSCH, the NR introduces the repeat transmission of PUSCH. For example, a plurality of PUSCHs carrying same data may be transmitted several times through different resources/antennas/redundancy versions, so as to obtain a diversity gain and reduce a Block Error Rate (BLER). Specifically, the repeat transmission may be carried out in a plurality of slots, as shown in FIG. 5. It may also be carried out on a plurality of antenna panels, as shown in FIG. 6. For multi-slot repeat, one piece of DCI may schedule a plurality of PUSCHs to transmit in a plurality of consecutive slots, carrying same data but using different redundancy versions. For multi-antenna panel repeat, the PUSCHs with same data are transmitted on different antenna panels respectively. A receiving end may be a same transmission/reception point (TRP) or different TRPs, for example, the receiving end may be TRP1 and/or TRP 2, while a sending end may be Antenna Panel 1 and/or Antenna Panel 2.

For codebook-based PUSCH transmission, the SRI may only indicate one SRS resource in one SRS resource set; and for non-codebook-based PUSCH transmission, the SRI may only indicate several SRS resources in one SRS resource set, where each resource is corresponding to a different transmission layer of a same PUSCH. In this way, when the PUSCH is repeatedly transmitted, a plurality of the PUSCHs may only obtain a same transmission parameter (such as, a transmit beam or the like) based on a same SRS resource, and thus the sufficient diversity gain cannot be obtained to ensure the transmission reliability. For example, when the indicated beam is just occluded, even several transmissions cannot improve the transmission performance.

FIG. 7 illustrates a schematic diagram of a signal transmission method 200 according to the embodiment of the present disclosure. As shown in FIG. 7, the method 200 may be performed by a terminal device, and the method 200 includes part or all of the following contents.

In S210, the terminal device determines a plurality of Sounding Reference Signal (SRS) resources or a plurality of SRS resource groups based on a Sounding Reference Signal Resource Indicator (SRI) in scheduling information, where the scheduling information is used for scheduling a plurality of Physical Uplink Shared Channels (PUSCH), and the plurality of SRS resources or the plurality of SRS resource groups are corresponding to the plurality of PUSCHs.

In S220, the terminal device determines transmission parameters of the plurality of PUSCHs based on the plurality of SRS resources or the plurality of SRS resource groups.

FIG. 8 illustrates a schematic diagram of a signal transmission method 300 according to the embodiment of the present disclosure. As shown in FIG. 8, the method 300 may be performed by a network device, and the method 300 includes part or all of the following contents.

In S310, the network device determines scheduling information based on a plurality of Sounding Reference Signal (SRS) resources or a plurality of SRS resource groups, where the scheduling information is used for scheduling a plurality of Physical Uplink Shared Channels (PUSCH), and the plurality of PUSCHs are corresponding to the plurality of SRS resources or the plurality of SRS resource groups.

In S320, the network device sends the scheduling information to a terminal device, where a Sounding Reference Signal Indicator (SRI) in the scheduling information is used for indicating the plurality of SRS resources or the plurality of SRS resource groups.

Figure 9:
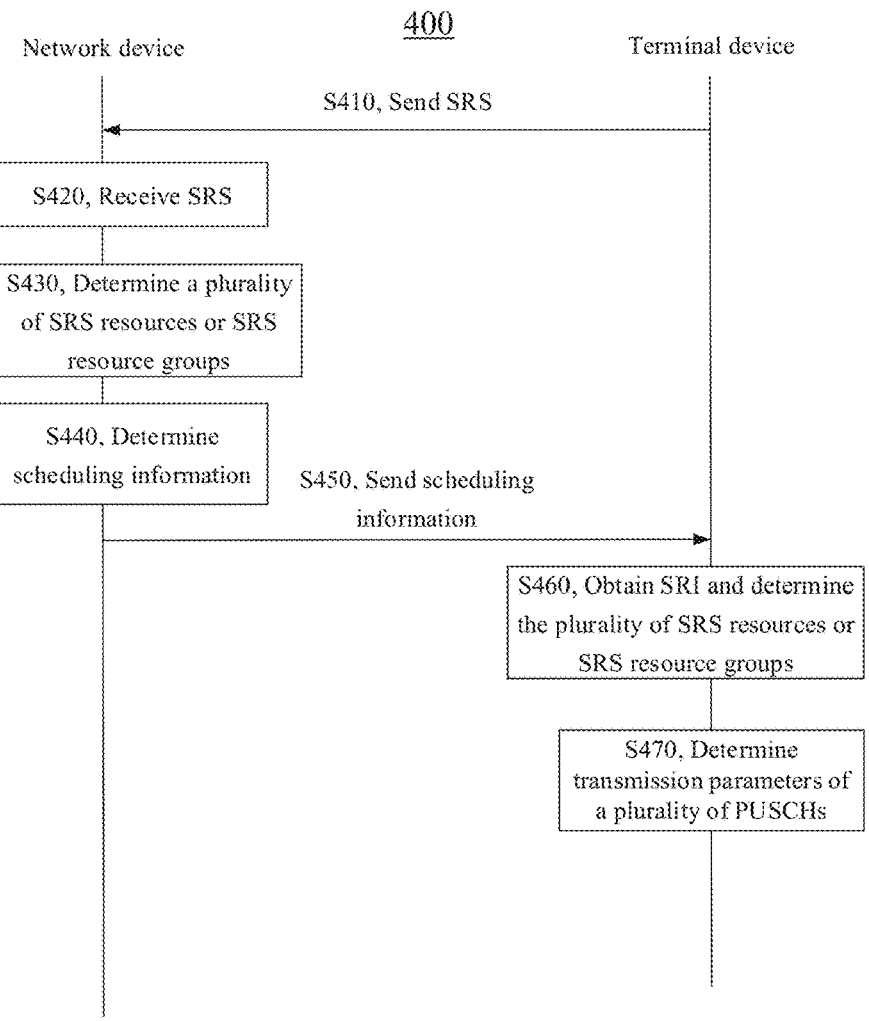
FIG. 9 is an interaction diagram of the signal transmission method provided by the embodiment of the present disclosure.

FIG. 9 illustrates a schematic flow chart of a signal transmission method 400 according to the embodiment of the present disclosure. As shown in FIG. 9, the method 400 may be implemented by the interaction between a terminal device and a network device, and specifically, the method 400 includes part or all of the following contents.

In S410, the terminal device sends an SRS on at least one SRS resource set, where the at least one SRS resource set may be preconfigured by the network device. Specifically, the at least one SRS resource set may be an SRS resource set preconfigured by the network device for code-based transmission, or the at least one SRS resource set may be an SRS resource set preconfigured by the network device for non-code-based transmission.

In S420, the network device receives the SRS sent by the terminal device on the at least one SRS resource set.

In S430, the network device may determine a plurality of SRS resources or a plurality of SRS resource groups from the at least one SRS resource set. If a PUSCH to be scheduled by the network device is codebook-based transmitted, then a plurality of SRS resources are determined from the at least one SRS resource set. If the PUSCH to be scheduled by the network device is non-codebook-based transmitted, then a plurality of SRS resource groups are determined from the at least one SRS resource set.

In S440, the network device determines scheduling information based on the plurality of SRS resources or the plurality of SRS resource groups, where the scheduling information may be used for scheduling a plurality of PUSCHs, and the scheduling information may include an SRI, and the SRI may indicate the plurality of SRS resources or the plurality of SRS resource groups. The scheduling information may also include a scheduled frequency domain resource, a Rank Indicator (RI), a Precoding Matrix Indicator (PMI), a Modulation and Coding Scheme (MC S), etc.

In S450, the network device may send the scheduling information to the terminal device, and the terminal device receives the scheduling information, where the scheduling information may be carried in one piece of DCI, and the scheduling information may schedule a plurality of PUSCH transmissions of the terminal device.

In S460, the terminal device may obtain the SRI from the scheduling information, and determine the plurality of SRS resources or the plurality of SRS resource groups based on the SRI.

In S470, the terminal device may determine transmission parameters of the plurality of PUSCHs based on the plurality of SRS resources or the plurality of SRS resource groups.

It should be noted that a corresponding relationship between the plurality of SRS resources or the plurality of SRS resource groups and the plurality of PUSCHs may be predetermined by the terminal device and the network device, or determined based on the redundancy version used by the plurality of PUSCHs, or configured to the terminal device by the network device through higher layer signaling, for example, the corresponding relationship between the plurality of SRS resources or the plurality of SRS resource groups and the plurality of PUSCHs is sent to the terminal device through RRC signaling.

Assuming that the number of the plurality of SRS resources or the plurality of SRS resource groups is K, and the number of the plurality of PUSCHs is N, then the corresponding relationship predetermined by the terminal device and the network device may include, but is not be limited to the following situations.

If K=N, then the plurality of SRS resources or the plurality of SRS resource groups are in a one-to-one mapping relationship with the plurality of PUSCHs, that is, the $k^{th}$ SRS resource or the $k^{th}$ SRS resource group may correspond to the $k^{th}$ PUSCH transmission, that is, the transmission parameter of the $k^{th}$ PUSCH may be determined based on the $k^{th}$ SRS resource or the $k^{th}$ SRS resource group.

If K>N, then it is possible to only use the first N SRS resources or SRS resource groups in the K SRS resources or SRS resource groups, and at this time, the first N SRS resources or SRS resource groups are in a one-to-one mapping relationship with the N PUSCHs. Or, it is possible to only use the last N SRS resources or SRS resource groups in the K SRS resources or SRS resource groups, and at this time, the last N SRS resources or SRS resource groups are in a one-to-one mapping relationship with the N PUSCHs. Or, it is possible to only use other N SRS resources or SRS resource groups in the K SRS resources or SRS resource groups.

If N>K, the $n^{th}$ PUSCH transmission may correspond to the $k^{th}$ SRS resource or SRS resource group, where k=[(n−1)mod K+1], that is, the plurality of SRS resources or SRS resource groups may be polled to correspond to a plurality of PUSCH transmissions. For example, if N=4 and K=2, then the index of the SRS resources corresponding to the N PUSCHs may be {0,1,0,1}; and when N=8 and K=2, the index of the SRS resources corresponding to the N PUSCHs may be {0,1,0,1,0,1,0,1}. The advantage of such correspondence is that the plurality of SRS resources or SRS resource groups may be cycled first to obtain multi-beam or multi-antenna panel diversity gain, so that the network side can detect the PUSCH more quickly and correctly.

If N=m*K (m is an integer greater than 1), the $n^{th}$ PUSCH transmission may correspond to the $k^{th}$ SRS resource or SRS resource group, where k=[n/m] (rounded up), that is, one SRS resource or SRS resource group may correspond to a plurality of consecutive PUSCH transmissions. For example, if N=4 and K=2, the index of the SRS resources corresponding to the N PUSCHs may be {0,0,1,1}; and when N=8 and K=2, the index of the SRS resources corresponding to the N PUSCHs may be {0,0,0,0,1,1,1,1}. The advantage of such correspondence is that when different SRS resources or SRS resource groups correspond to different beams, it can reduce the beam switching of the terminal and reduce the complexity.

In addition, the terminal device may also consider the diversity gain and the beam switching frequency of the terminal at the same time, to make a compromise between the above two methods. For example, if N=4 and K=2, the index of the SRS resources corresponding to the N PUSCHs may be {0,1,1,0}; and when N=8 and K=2, the index of the SRS resources corresponding to the N PUSCHs may be {0,0,1,1,1,1,0,0}. In this way, the beam switching frequency can be reduced without affecting the diversity gain.

In another method, the terminal device may determine the SRS resources or SRS resource groups corresponding to the plurality of PUSCHs, based on a Redundancy Version (RV) used by the data on the plurality of PUSCHs. Specifically, the network side may indicate a RV sequence used by the current PUSCH transmission from a plurality of agreed RV sequences through high layer signaling. The terminal device determines a corresponding index sequence based on the currently used RV sequence, and determines an SRS resource corresponding to each PUSCH from the plurality of SRS resources based on the index sequence, or determines an SRS resource group corresponding to each PUSCH from the plurality of SRS resource groups based on the index sequence. The index in the index sequence is an index of an SRS resource corresponding to each PUSCH in the plurality of SRS resources, or is an index of a corresponding SRS resource group in the plurality of SRS resource groups. The terminal device and the network side may agree on the index sequence corresponding to each RV sequence in advance.

For example, if the RV sequence is {0,0,0,0}, then the corresponding index sequence may be {0,1,0,1}. At this time, cycling is performed between a plurality of SRS resources or SRS resource groups first, and multi-beam or multi-panel diversity gain may be obtained in the first few transmissions, so that the network side can detect the PUSCH more quickly and correctly. If the RV sequence is {0,3,0,3}, then the corresponding index sequence may be {0,0,1,1} or {0,1,1,0}. In this case, a PUSCH corresponding to one SRS resource or SRS resource group may be polled to be transmitted by using different RV versions, and the diversity gain brought out by different beams and different RV versions is obtained at the same time.

In addition, the network side may also preconfigure an index sequence of the SRS resources or SRS resource groups corresponding to the plurality of PUSCHs through high layer signaling, and the terminal device determines an SRS resource or resource group corresponding to each PUSCH based on the index sequence. The index in the index sequence is an index of an SRS resource corresponding to each PUSCH in the plurality of SRS resources, or an index of a corresponding SRS resource group in the plurality of SRS resource groups.

For example, assuming that the number of the plurality of SRS resources or the plurality of SRS resource groups is K=2, and the number of the plurality of PUSCHs is N (N=1,2,4,8, which may be configured by the network side), then the length of the index sequence is K, for example, it may be {0,0} or {0,1} or {1,1}, and the network side configures which index sequence is to be used through high layer signaling. Taking an SRS resource as an example, the index of the SRS resource corresponding to the $n^{th}$ PUSCH of the N PUSCHs in the plurality of SRS resources is the $k^{th}$ (k=mod(n−1, K)+1) index value of the index sequence.

For another example, the network side may directly configure an index sequence of SRS resources corresponding to N PUSCHs through Radio Resource Control (RRC) signaling, that is, the length of the index sequence may be N. For example, assuming N=4 and K=2, then the index sequence may be {0,1,0,1} or {0,0,1,1} or {0,0,0,0} or {1,1,1,1}, and the network side informs the terminal device of the index sequence used for the current transmission. Taking an SRS resource as an example, the index of the SRS resource corresponding to the $n^{th}$ PUSCH of the N PUSCHs in the plurality of SRS resources is the $n^{th}$ index value of the index sequence.

Typically, each PUSCH in the plurality of PUSCHs is corresponding to one SRS resource in the plurality of SRS resources or one SRS resource group in the plurality of SRS resource groups. In other words, the plurality of PUSCHs are in a one-to-one corresponding relationship with the plurality of SRS resources or the plurality of SRS resource groups, or one SRS resource or SRS resource group may be corresponding to a plurality of PUSCHs.

The transmission parameter of PUSCH may include at least one of a number of transmission layer, a precoding matrix, a number of antenna port, and a transmit beam described above, and may also include parameters such as a power control parameter or an antenna panel used for PUSCH transmission, etc. Here, the power control parameter may include at least one of an open-loop power control parameter (such as a target power, a path loss factor), a path loss reference signal, a closed-loop power control parameter, and a maximum transmission power.

Therefore, in the signal transmission method of the embodiments of the present disclosure, the terminal device may determine a plurality of SRS resources or a plurality of SRS resource groups based on an SRI in scheduling information, and then the terminal device may determine transmission parameters of the plurality of PUSCHs scheduled by the scheduling information based on the plurality of SRS resources or the plurality of SRS resource groups, so that the plurality of PUSCHs may be transmitted based on different transmission parameters, which is beneficial to achieve the purpose of improving the transmission reliability in repeat transmission of PUSCH.

Optionally, the network device may configure at least one SRS resource set for the terminal device. Specifically, the network device may send configuration information to the terminal device, where the configuration information is used for indicating the at least one SRS resource set. A plurality of SRS resources indicated by an SRI may belong to a same SRS resource set or different SRS resource sets, and a plurality of SRS resource groups indicated by an SRI may also belong to a same SRS resource set or different SRS resource sets.

Optionally, the SRI may include an index of the plurality of SRS resources in an SRS resource set to which the plurality of SRS resources belong. If the plurality of SRS resources belong to different SRS resource sets, that is, the plurality of SRS resources are in a one-to-one corresponding relationship with the plurality of SRS resource sets, then the SRI is used for indicating an index of one SRS resource from each SRS resource set in a plurality of SRS resource sets. After receiving the SRI, the terminal device may determine the plurality of SRS resources from the plurality of SRS resource sets respectively, that is, determine one SRS resource from each SRS resource set, based on the indexes of the SRS resources included in the SRI.

Optionally, the SRI may include a plurality of index groups, and each index group in the plurality of index groups includes an index of the SRS resources in one SRS resource group in the plurality of SRS resource groups, in an SRS resource set to which the SRS resource belongs. If the plurality of SRS resources belong to different SRS resource sets, that is, the plurality of SRS resources are in a one-to-one corresponding relationship with the plurality of SRS resource sets, then the SRI is used for indicating an index of each SRS resource which constitutes one SRS resource group, from each SRS resource set in the plurality of SRS resource sets.

It should be understood that the corresponding relationship between the order of the indexes included in the SRI and the SRS resource sets may be agreed by the terminal device and the network device in advance, or preconfigured by the network device. Once the terminal device obtains an index of an SRS resource indicated by the SRI, it may determine the configuration of the SRS resource in the corresponding SRS resource set.

Optionally, the SRI may include a resource Identity (ID) of each SRS resource in the plurality of SRS resources, and the terminal device may determine the configurations of the plurality of SRS resources based on the SRS resource IDs indicated by the SRI. Or, the SRI includes a plurality of resource Identity (ID) sets, and each resource ID set in the plurality of resource ID sets includes a resource ID of an SRS resource in one SRS resource group of the plurality of SRS resource groups, and the terminal device may determine the plurality of SRS resource groups based on the resource ID sets indicated by the SRI.

Optionally, the scheduling information may be carried in Downlink Control Information (DCI) or Radio Resource Control (RRC) signaling. A plurality of SRIs may also be carried in DCI, and each SRI indicates one SRS resource or one SRS resource group, so that the terminal device may obtain a plurality of SRS resources or SRS resource groups.

Optionally, the terminal device may also determine only one SRS resource or SRS resource group based on an SRI, and expand to obtain a plurality of SRS resources or SRS resource groups based on a mode agreed with the network device. For example, if an SRS resource index indicated by an SRI is k, then the plurality of SRS resources include the $k^{th}$ or the $(k+1)^{th}$ SRS resource of each SRS resource set in a plurality of SRS resource sets. For another example, if an SRS resource index indicated by an SRI is {m,n}, then the plurality of SRS resource groups include the SRS resource group which is composed of the $m^{th}$ and $n^{th}$ SRS resources of each SRS resource set in a plurality of SRS resource sets.

Optionally, in the embodiments of the present disclosure, the terminal device determining transmission parameters of the plurality of PUSCHs based on the plurality of SRS resources or the plurality of SRS resource groups may include at least one of the following manners.

The terminal device may determine a precoding matrix used for transmitting an SRS on each SRS resource in the plurality of SRS resources or each SRS resource group in the plurality of SRS resource groups, as a precoding matrix used for transmitting a PUSCH corresponding to the SRS resource or the SRS resource group.

The terminal device may determine a transmit beam used for transmitting an SRS on each SRS resource in the plurality of SRS resources or each SRS resource group in the plurality of SRS resource groups, as a transmit beam used for transmitting a PUSCH corresponding to the SRS resource or the SRS resource group.

The terminal device may determine an antenna panel used for transmitting an SRS on each SRS resource in the plurality of SRS resources or each SRS resource group in the plurality of SRS resource groups, as an antenna panel used for transmitting a PUSCH corresponding to the SRS resource or the SRS resource group.

The terminal device determines, based on a power control parameter corresponding to each SRS resource in the plurality of SRS resources or each SRS resource group in the plurality of SRS resource groups, a power control parameter of a PUSCH corresponding to the SRS resource or the SRS resource group.

The terminal device may determine a number of resources included in each SRS resource group in the plurality of SRS resource groups as a number of transmission layer of a PUSCH corresponding to the SRS resource group.

The terminal device determines, based on a number of ports of each SRS resource in the plurality of SRS resources, and a Precoding Matrix Indicator (PMI) included in the scheduling information, a precoding matrix used by a PUSCH corresponding to the SRS resource.

Optionally, the terminal device may also take the transmission parameters used by the plurality of SRS resources or the plurality of SRS resource groups, as a reference value for the transmission parameters of the PUSCH corresponding to the SRS resource or the SRS resource group. For example, the terminal device may add an offset to a power control parameter corresponding to a plurality of SRS resources or SRS resource groups, as a power control parameter of a corresponding PUSCH. It should be understood that any of the PUSCH transmission parameters listed above may directly take a transmission parameter used by an SRS resource or an SRS resource group as a transmission parameter of a corresponding PUSCH, or may also be determined by deforming a transmission parameter of an SRS resource or an SRS resource group, which will not be described in detail for brevity.

Optionally, the terminal device determining a power control parameter of a corresponding PUSCH based on a power control parameter corresponding to each SRS resource in the plurality of SRS resources or each SRS resource group in the plurality of SRS resource groups may include, but is not limited to, the following modes: the terminal device may determine a PUSCH power control parameter corresponding to each SRS resource or each SRS resource group, as the power control parameter of the PUSCH corresponding to the SRS resource or the SRS resource group; or the terminal device may determine a power control parameter of a PUSCH corresponding to each SRS resource from a PUSCH power control parameter which is corresponding to an SRS resource set to which each SRS resource belongs, based on an index of each SRS resource or the SRI; or the terminal device may determine a power control parameter of a PUSCH corresponding to each SRS resource group from a PUSCH power control parameter which is corresponding to an SRS resource set to which each SRS resource group belongs, based on the index of each SRS resource group or the SRI.

At present, a transmission power of PUSCH may be calculated by the following formula:

$$P_{PUSCH,b,f,c}(i, j, q_d, l) =$$
$$\min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

where i is an index of one PUSCH transmission, j is an open-loop power control parameter index (including a target power $P_{O\_PUSCH,b,f,c}(j)$ and a path loss factor $\alpha_{b,f,c}(j)$); $q_d$ is an index of the reference signal for measuring the path loss, and is used for obtaining the path loss value $PL_{b,f,c}(q_d)$, and is also an open-loop power control parameter; $f_{b,f,c}(i, l)$ is a closed-loop power control adjustment factor, where l is a closed-loop power control process.

The terminal device may obtain a power control parameter of a PUSCH through the embodiment of the present disclosure, and use the above formula to obtain the transmission power used by the PUSCH.

Optionally, each SRS resource in the plurality of SRS resources may be corresponding to one transmission point (TRP) or one antenna panel, or each SRS resource group in the plurality of SRS resource groups may be corresponding to one TRP or one antenna panel.

The terminal device may have a plurality of antenna panels (panels) used for uplink transmission, and one panel includes one group of physical antennas, and each panel has an independent RF channel. The terminal device needs to inform the gNB of a number of supported panel in a capability report. At the same time, the terminal device may also need to inform the gNB whether it has the capability to transmit signals on a plurality of panels simultaneously. Since the channel conditions corresponding to different panels are different, different panels need to use different transmission parameters based on respective channel information. In order to obtain these transmission parameters, different SRS resources or SRS resource groups may be configured for different panels to obtain uplink channel information. For example, in order to perform uplink beam management, one SRS resource or SRS resource group may be configured for each panel, so that each panel performs beam management respectively and determines an independent analog beam. In order to obtain precoding information used for PUSCH transmission, one SRS resource or SRS resource group may be also configured for each panel, which is used for obtaining a beam, a precoding vector, a number of transmission layer and other transmission parameters used for PUSCH transmission on the panel.

In uplink non-coherent transmission, different TRPs may also independently schedule a PUSCH transmission of a same terminal device. Different PUSCH transmissions may be configured with independent transmission parameters, such as a transmit beam, a precoding matrix, a number of transmission layer, etc. Each TRP may be configured with one SRS resource or SRS resource group, and an SRS resource or SRS resource group corresponding to a TRP is used for determining a transmission parameter, so that the transmission parameter of the PUSCH and the channel of the TRP are better matched, and the spectrum efficiency of uplink transmission is improved.

Optionally, the plurality of SRS resources may have a same number of ports, or the plurality of SRS resource groups may include a same number of SRS resources.

Optionally, in the embodiments of the present disclosure, the plurality of PUSCHs may be transmitted in consecutive slots or consecutive PUSCH transmission opportunities respectively, or the plurality of PUSCHs may be transmitted in a same slot. For example, the plurality of PUSCHs are transmitted in different frequency domains in a same slot. The plurality of PUSCHs may also be respectively transmitted on different antenna panels. The plurality of PUSCHs may also carry same data information.

Therefore, in the signal transmission method of the embodiments of the present disclosure, when the terminal device performs the repeat transmission of PUSCH in a plurality of slots or on a plurality of antenna panels, it may use different SRS resources or SRS resource groups to determine the used transmission parameters. The different SRS resources or resource groups may be from a same SRS resource set or different SRS resource sets, so that the terminal device may use different precoding matrixes, transmit beams or antenna panels to perform the repeat transmission of same data, thereby improving the reliability of PUSCH transmission. Moreover, when using different transmit beams or antenna panels for transmission, it may also determine power control parameters of different PUSCHs through corresponding SRS resources or resource groups, so as to perform independent uplink power control for different beams or different antenna panels, so that the transmission power may match the current transmission mode better.

The technical solution of the present disclosure will be described in detail below through the first embodiment to the third embodiment.

First embodiment: codebook-based transmission, the terminal device is configured with N SRS resource sets, where N is greater than 1.

1. The network device preconfigures N SRS resource sets used for codebook-based PUSCH transmission through RRC signaling, that is, usage parameter of the set is configured as a codebook.

2. The terminal device sends an SRS on a corresponding SRS resource, based on the configuration of the SRS resource sets.

3. The network device receives the SRS sent by the terminal device, and determines N SRS resources from the N SRS resource sets, where the network device determines one SRS resource from each SRS resource set respectively. The network device determines scheduling information of N PUSCH transmissions based on the N SRS resources.

The PUSCH is codebook-based transmitted, that is, txConfig in a RRC parameter domain PUSCH-config is configured as a codebook.

Specifically, the network device may determine scheduling information of each PUSCH in N PUSCHs respectively based on each SRS resource in N SRS resources, that is, the SRS resource is in a one-to-one corresponding relationship with the PUSCH, and the scheduling information of each PUSCH is determined respectively. In addition, the network device may also determine the same scheduling information which is used for the N PUSCH transmissions, based on the N SRS resources. The scheduling information includes an SRI, which is used for indicating the N SRS resources in the N SRS resource sets to the terminal device. The scheduling information may also include a frequency domain resource, an SRI, a RI, a PMI, a MCS, etc. which are scheduled.

4. The network device sends one piece of DCI which is used for scheduling the N PUSCH transmissions, where the DCI includes the scheduling information. The scheduling information is applied to all the N PUSCH transmissions, that is, the N PUSCH transmissions use the common scheduling information.

Specifically, the N PUSCH transmissions carry same data information. Specifically, the N PUSCH transmissions carrying the same data information may also be expressed as the N PUSCHs using a same HARQ process, or the N PUSCHs carrying a same transmission block. In addition, carrying the same data information herein means carrying same data source bits, that is, the data bits before channel coding are the same. The data bits after channel coding may be different.

It should be noted that if the plurality of PUSCHs carry the same data, the plurality of PUSCHs mentioned in the present disclosure may also be referred to as several repetitions of one PUSCH, and N PUSCHs may also be referred to as N repetitions of one PUSCH, and the $n^{th}$ PUSCH of the N PUSCHs may also be referred to as the $n^{th}$ repetition of one PUSCH, which will not be described repetitively hereinafter.

5. The terminal device receives the DCI sent by the network device, and obtains an SRI from the DCI, and determines the N SRS resources based on the SRI.

Different SRS resources in the N SRS resources belong to different SRS resource sets, that is, N SRS resources are included in N SRS resource sets respectively, and these N SRS resource sets are preconfigured SRS resource sets used for codebook-based PUSCH transmission (that is, the usage parameter of the set is configured as a codebook).

Specifically, the terminal device determining N SRS resources based on the SRI, may use the following methods.

Method 1: The SRI indicates respective indexes of N SRS resources in the N SRS resource sets. The terminal device determines the N SRS resources from the N SRS resource sets, respectively, based on the N index values indicated by the SRI. For example, assuming N=2, then information indicated by an SRI includes {SRS Resource Index 1, SRS Resource Index 2}, and the terminal device determines one SRS resource from SRS Resource Set 1 based on Index 1, and determines the other SRS resource from SRS Resource Set 2 based on Index 2. The SRS resource index values corresponding to different SRI values may be agreed in a protocol, or may be informed to the terminal device by the network device through high layer signaling in advance.

Method 2: The SRI indicates respective resource IDs of N SRS resources (where resource IDs are corresponding to high layer parameter SRS-ResourceIds, that is, indicating N SRS-ResourceIds), and the terminal device may directly determine configurations of the N SRS resources which are corresponding to the resource IDs, from high layer parameters. The SRS resource ID corresponding to each SRI value in the SRI indication field is preconfigured to the terminal device by the network device through higher layer signaling. For example, assuming N=2, then each SRI value may indicate {SRS Resource ID1 configured by higher layer, SRS Resource ID2 configured by higher layer}. Each SRS resource configured by RRC has a dedicated SRS resource ID SRS-ResourceId. The SRS resource ID indicated by the SRI should be included in the N SRS resource sets, otherwise the terminal device may consider it as an incorrect configuration and does not perform the corresponding PUSCH transmission.

For codebook-based PUSCH transmission, the N SRS resources may have a same number of SRS ports.

6. The terminal device may determine the transmission parameters of the N PUSCHs respectively based on the N SRS resources, where each SRS resource in the N SRS resources is corresponding to one PUSCH in the N PUSCHs, that is, the N SRS resources are in a one-to-one corresponding relationship with the N PUSCHs. The transmission parameter includes at least one of a precoding matrix, a transmit beam, a power control parameter, and an antenna panel used for PUSCH transmission.

The terminal device determining the transmission parameters of the N PUSCHs respectively based on the N SRS resources, may be as the following.

For example, the terminal device determines a codebook used for uplink transmission based on a number of ports of the N SRS resources; and based on a PMI included in the DCI, determines a target codeword from the codebook, as a precoding matrix of the N PUSCHs (that is, N PUSCHs use a same precoding matrix).

For another example, the terminal device takes a transmit beam used for sending an SRS signal on the N SRS resources, as the transmit beam used for transmitting the N PUSCHs. Specifically, the terminal takes a transmit beam used for sending an SRS signal on the $k^{th}$ SRS resource, as the transmit beam used for transmitting the $k^{th}$ PUSCH. The transmit beam herein is also referred to as a Spatial domain transmission filter. Furthermore, the terminal device may take an antenna panel used for sending an SRS signal on the N SRS resources, as the antenna panel used for transmitting the N PUSCHs. Specifically, the terminal determines an antenna panel used for sending an SRS signal on the $k^{th}$ SRS resource, as the antenna panel used for transmitting the $k^{th}$ PUSCH.

In addition, the terminal device may also determine the power control parameters of the N PUSCHs, based on the PUSCH power control parameters which are respectively corresponding to the N SRS resources, specifically, the following methods may be used.

Method 1: The network device may preconfigure a power control parameter corresponding to each SRS resource in the N SRS resources through higher layer signaling, and the terminal device determines a PUSCH power control parameter corresponding to each SRS resource as a power control parameter of a corresponding PUSCH, so as to obtain respective power control parameters of N PUSCHs. The network device configuring a power control parameter corresponding to each SRS resource in the N SRS resources may include the following configuration modes.

1) When the network device configures a PUSCH power control parameter through a SRI-PUSCH-PowerControl, each SRI-PUSCH-PowerControl includes one SRS resource ID (high layer parameter SRS-ResourceId), and the terminal device obtains a PUSCH power control parameter in a corresponding SRI-PUSCH-PowerControl based on the SRS resource ID, as the power control parameter of the PUSCH corresponding to the SRS resource determined by the SRS resource ID. At this time, SRI-PUSCH-PowerControls are respectively configured for each SRS resource.

2) When the network device configures a PUSCH power control parameter through a SRI-PUSCH-PowerControl, each SRI-PUSCH-PowerControl includes N groups of PUSCH power control parameters, and each SRS resource indicated by an SRI is corresponding to one group of PUSCH power control parameters. The terminal device determines respective power control parameters of N PUSCHs based on the PUSCH power control parameter corresponding to each SRS resource in the N SRS resources. Specifically, the SRI-PUSCH-PowerControl corresponding to the $k^{th}$ SRS resource indicated by the SRI is equal to the $k^{th}$ group of power control parameters in the SRI-PUSCH-PowerControls of the SRI value.

Method 2: The network device preconfigures a PUSCH power control parameter corresponding to each SRS resource set in the N SRS resource sets through higher layer signaling, and the terminal device determines the PUSCH power control parameter corresponding to the SRI from the PUSCH power control parameter corresponding to an SRS resource set where each SRS resource is located, as the power control parameter of the PUSCH corresponding the SRS resource. The network device configuring a PUSCH power control parameter corresponding to each SRS resource set in the N SRS resource sets may include the following configuration modes.

1) When the network device configures a PUSCH power control parameter through a SRI-PUSCH-PowerControl, each SRI-PUSCH-PowerControl includes one SRS resource set ID (high layer parameter SRS-ResourceId), indicating that the SRI-PUSCH-PowerControl is corresponding to the SRS resource set. The terminal device determines a set ID based on an SRS resource set where each SRS resource in the N SRS resources is located, and based on the set ID and the SRI, the terminal device finds a SRI-PUSCH-Power-Control which includes the set ID and of which the corresponding SRI-PUSCH-PowerControlId is equal to the SRI value, as the power control parameter of the PUSCH corresponding to the SRS resource. N PUSCHs may be corresponding to N different SRI-PUSCH-PowerControls.

2) When the network device configures a PUSCH power control parameter through a SRI-PUSCH-PowerControl, it configures K groups of power control parameters SRI-PUSCH-PowerControls for each SRS resource set, which includes PUSCH power control parameters which are respectively corresponding to K SRI values supported by the SRS resource set. Generally, K is a number of SRS resource included in the SRS resource set. The terminal device determines corresponding K groups of power control parameters based on an SRS resource set where each SRS resource in the N SRS resources is located, and determines the power control parameter corresponding to the SRS resource from K groups of power control parameters based on the indicated SRI, so as to obtain the respective power control parameters corresponding to N PUSCHs. N PUSCHs may be corresponding to N different SRI-PUSCH-PowerControls.

7. The terminal device sends the N PUSCHs based on the scheduling information in the DCI and the determined transmission parameter. The N PUSCH transmissions may carry same data information.

Specifically, the N PUSCHs may be transmitted based on same scheduling information in the DCI, for example, using a same number of transmission layer, a same DMRS port, a same MCS, a same precoding matrix and a same HARQ process to transmit the PUSCH. The transmission may also be performed based on different scheduling information in the DCI, for example, using different frequency domain resources (for example, different frequency hopping modes) and time domain resources (for example, a starting position of an OFDM symbol and a number of occupied OFDM symbol) for transmission.

The N PUSCHs are transmitted based on the transmission parameters respectively determined by the N SRS resources. For example, the $k^{th}$ PUSCH transmission is transmitted based on the transmission parameters determined by the $k^{th}$ SRS resource in the N SRS resources. Specifically, the N PUSCHs are respectively transmitted by using N antenna panels of the terminal device.

The terminal device obtains an uplink transmission power based on the determined power control parameter, so as to send the N PUSCHs. If the terminal device determines N groups of power control parameters based on N SRS resources, then the transmission powers are determined respectively based on these N groups of power control parameters, so as to send N PUSCHs (that is, transmission powers of N PUSCHs may be different). If the terminal device only determines one group of power control parameters, the N PUSCHs use the same transmission power.

Specifically, the N PUSCHs may be transmitted in N consecutive slots. The terminal determines a position of the first slot in the N consecutive slots based on the DCI. The N PUSCHs may also be transmitted in N consecutive PUSCH durations, where one PUSCH duration is composed of several OFDM symbols used for transmitting one PUSCH, and may be less than a length of one slot. The terminal may determine the position and length of the PUSCH duration based on the DCI. The number of OFDM symbol occupied by the PUSCH repetitively transmitted in different slots may be the same or different. The length of the PUSCH duration occupied by the PUSCH repetitively transmitted may also be the same or different. If different, the length of each duration may be indicated by the DCI.

Figure 10:
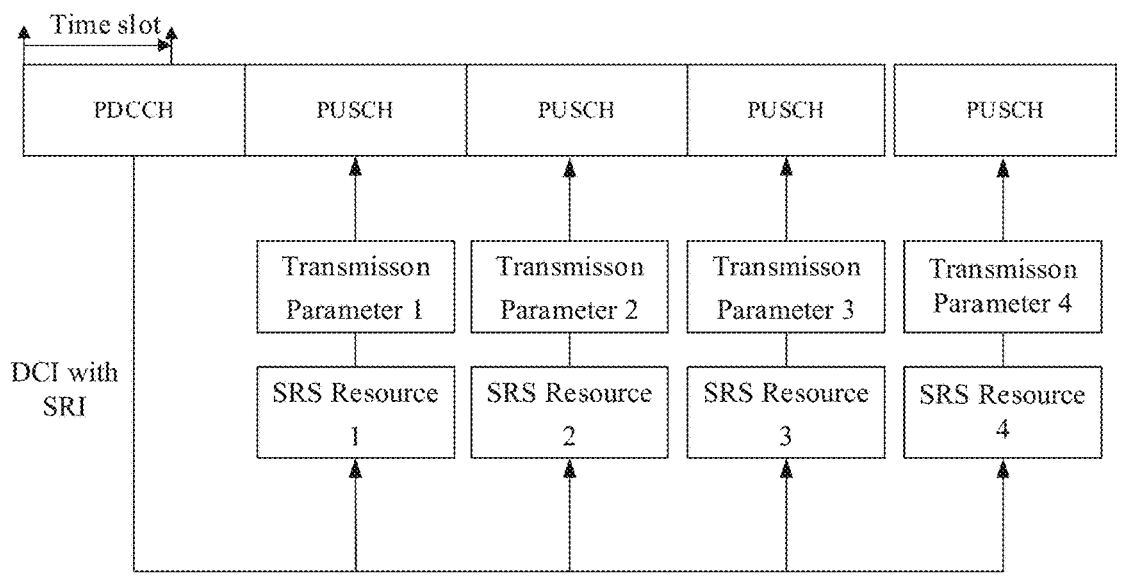
FIG. 10 is a schematic diagram corresponding to a first embodiment.

The schematic diagram of the first embodiment is shown in FIG. 10, where N=4, SRS Resource 1, SRS Resource 2, SRS Resource 3, and SRS Resource 4 are determined based on the SRI in the DCI carried by the Physical Downlink Control Channel (PDCCH). And based on the 4 SRS resources, transmission parameter 1, transmission parameter 2, transmission parameter 3, and transmission parameter 4 of the PUSCH are respectively determined, which are respectively applied to the PUSCH scheduled by the DCI and are to be transmitted in 4 consecutive slots after the DCI.

Based on the method of the first embodiment, when the terminal device performs PUSCH repeat transmission in a plurality of consecutive slots, SRS resources in different SRS resource sets may be used for determining the used transmission parameters (one SRS resource set may be corresponding to one antenna panel), so that different beams, antenna panels or transmission powers may be used for repeat transmission of same data, which improves the reliability of PUSCH transmission.

Second embodiment: codebook-based transmission, the terminal device is configured with one SRS resource set.

1. The network device preconfigures one SRS resource set used for codebook-based PUSCH transmission through RRC signaling, that is, the usage parameter of the set is configured as a codebook.

2. The terminal device sends an SRS on a corresponding SRS resource based on the configuration of the SRS resource set.

3. The network device receives the SRS sent by the terminal device, and determines N SRS resources from the SRS resource set, and determines scheduling information of N PUSCH transmissions based on the N SRS resources. The PUSCH is codebook-based transmitted, that is, a txConfig in an RRC parameter domain PUSCH-config is configured as a codebook. The scheduling information herein includes the scheduled frequency domain resource, SRI, RI, PMI, MCS, etc.

The network device may determine scheduling information of each PUSCH in N PUSCHs based on each SRS resource in N SRS resources, that is, the SRS resource is in a one-to-one corresponding relationship with the PUSCH, and the scheduling information of each PUSCH is determined respectively. In addition, the network device may also determine the same scheduling information which is used for the N PUSCH transmissions, based on the N SRS resources.

The scheduling information includes an SRI, which is used for indicating the N SRS resources from K SRS resources included in the SRS resource set.

4. The network device sends one piece of DCI which is used for scheduling the N PUSCH transmissions, where the DCI includes the scheduling information. Here, assuming that the scheduling information is applied to all the N PUSCH transmissions, that is, the N PUSCH transmissions use the common scheduling information.

5. The terminal device receives the DCI sent by the network device, and obtains an SRI from the DCI, and determines the N SRS resources based on the SRI. The terminal device determining N SRS resources based on the SRI, may use the following method.

Method 1: The SRI indicates indexes of N SRS resources in the SRS resource set. The terminal device determines the N SRS resources from the SRS resource set based on the N index values indicated by the SRI. For example, assuming N=2, then information indicated by the SRI includes {SRS Resource Index 1, SRS Resource Index 2}, and the terminal device determines two SRS resources from the SRS resource set configured for codebook-based transmission, based on Index 1 and Index 2. The SRS resource index values corresponding to different SRI values may be agreed in a protocol, or may be informed to the terminal device by the network device through higher layer signaling in advance.

Method 2: The SRI indicates respective resource IDs of N SRS resources (where the resource IDs are corresponding to higher layer parameter SRS-ResourceIds, that is, indicating N SRS-ResourceIds), and the terminal device may directly determine the configurations of the N SRS resources which are corresponding to the resource IDs, from higher layer parameters. The SRS resource ID corresponding to each SRI value in the SRI indication field is preconfigured to the terminal device by the network device through higher layer signaling. For example, assuming N=2, then each SRI value may indicate {SRS Resource ID1 configured by higher layer, SRS Resource ID2 configured by higher layer}. Each SRS resource configured by RRC has a dedicated SRS resource ID SRS-ResourceId. The SRS resource ID indicated by the SRI should be included in the SRS resource set; otherwise the terminal device may consider it as an incorrect configuration and does not perform the corresponding PUSCH transmission.

6. The terminal device determines the transmission parameters of the N PUSCHs respectively based on the N SRS resources, where each SRS resource in the N SRS resources is corresponding to one PUSCH in the N PUSCHs, that is, the N SRS resources are in a one-to-one corresponding relationship with the N PUSCHs. The transmission parameter includes at least one of a precoding matrix, a transmit beam, a power control parameter, and an antenna panel used for PUSCH transmission. The method of the terminal device determining a precoding matrix, a transmit beam, or an antenna panel based on N SRS resources is same as that in the first embodiment, which is not described again herein.

The terminal device may determine the power control parameters of the N PUSCHs, based on the PUSCH power control parameters which are respectively corresponding to the N SRS resources. Specifically, the network device preconfigures a power control parameter corresponding to each SRS resource in the N SRS resources through higher layer signaling, and the terminal device determines a PUSCH power control parameter corresponding to each SRS resource, as a power control parameter of a corresponding PUSCH, so as to obtain respective power control parameters of N PUSCHs. The network device configuring a power control parameter corresponding to each SRS resource in the N SRS resources may include the following configuration modes.

1) When the network device configures a PUSCH power control parameter through a SRI-PUSCH-PowerControl, each SRI-PUSCH-PowerControl includes one SRS resource ID (high layer parameter SRS-ResourceId), and the terminal device obtains a PUSCH power control parameter in a corresponding SRI-PUSCH-PowerControl based on an SRS resource ID, as the power control parameter of the PUSCH corresponding to the SRS resource determined by the SRS resource ID. At this time, SRI-PUSCH-PowerControls are respectively configured for each SRS resource.

2) When the network device configures a PUSCH power control parameter through the SRI-PUSCH-PowerControl, each SRI-PUSCH-PowerControl includes N groups of PUSCH power control parameters, and each SRS resource indicated by the SRI is corresponding to a group of PUSCH power control parameters. The terminal device determines respective power control parameters of N PUSCHs, based on a PUSCH power control parameter corresponding to each SRS resource in the N SRS resources. Specifically, the SRI-PUSCH-PowerControlId corresponding to the $k^{th}$ SRS resource indicated by the SRI is equal to the $k^{th}$ group of power control parameters in the SRI-PUSCH-PowerControls of the SRI value.

7. The terminal device sends the N PUSCHs based on the scheduling information in the DCI and the determined transmission parameter. The specific method is the same as the method of the first embodiment, which is not described again herein.

Based on the method of the second embodiment, when the terminal device performs PUSCH repeat transmission in a plurality of consecutive slots, different SRS resources may be used for determining the used transmission parameters, so that different beams or transmission powers may be used for repeat transmission of same data, which improves the reliability of PUSCH transmission.

Third embodiment: non-codebook-based transmission, the terminal device is configured with N SRS resource sets, where N is greater than 1.

1. The network device preconfigures N SRS resource sets used for non-codebook-based PUSCH transmission through RRC signaling, that is, the usage parameter of the set is configured as nonCodebook, here assuming that N>1.

2. The terminal device sends an SRS on a corresponding SRS resource, based on the configuration of the SRS resource sets.

3. The network device receives the SRS sent by the terminal device, and determines N SRS resource groups from the N SRS resource sets, where the network device determines one SRS resource group from each SRS resource set. The network device determines scheduling information of N PUSCH transmissions based on the N SRS resource groups. Each SRS resource group may include one or more SRS resources in one SRS resource set, and an SRS resource in each SRS resource group only includes one SRS port. The PUSCH is non-codebook-based transmitted, that is, txConfig in RRC parameter domain PUSCH-config is configured as nonCodebook. The scheduling information herein includes the scheduled frequency domain resource, SRI, MCS, etc.

Specifically, the network device may determine scheduling information of each PUSCH in N PUSCHs respectively, based on each SRS resource group in N SRS resource groups, that is, the SRS resource group is in a one-to-one corresponding relationship with the PUSCH, and the scheduling information of each PUSCH is determined respectively. In addition, the network device may also determine the same scheduling information which is used for the N PUSCH transmissions, based on the N SRS resource groups. The scheduling information includes an SRI which is used for indicating the N SRS resource groups from the N SRS resource sets.

4. The network device sends one piece of DCI which is used for scheduling the N PUSCH transmissions, where the DCI includes the scheduling information. The scheduling information is applied to all the N PUSCH transmissions, that is, the N PUSCH transmissions use the common scheduling information.

5. The terminal device receives the DCI sent by the network device, and obtains the SRI from the DCI, and determines the N SRS resource groups based on the SRI.

Different SRS resource groups in the N SRS resource groups belong to different SRS resource sets, that is, N SRS resource groups are included in N SRS resource sets respectively, and these N SRS resource sets are preconfigured SRS resource sets used for non-codebook-based PUSCH transmission (that is, the usage parameter of the set is configured as nonCodebook).

Specifically, the terminal device determining N SRS resource groups based on the SRI, may use the following methods.

Method 1: The SRI indicates indexes of SRS resources which are respectively included in the N SRS resource groups, in the N SRS resource sets, i.e., including N groups of SRS resource indexes. The terminal device determines the N SRS resource groups from the N SRS resource sets, respectively, based on the N groups of index values indicated by the SRI. One group of index values is used for determining one SRS resource group, and includes at most K index values (K is a number of the SRS resource included in the SRS resource set). For example, assuming N=2, then information indicated by the SRI includes {SRS Resource Index Group 1, SRS Resource Index Group 2}, where each index group includes at most 4 index values (4 is the number of the SRS resource included in the SRS resource set). Here, it is assumed that Index Group 1 includes {1,2}, and Index Group 2 includes {1,4}. The terminal device determines two SRS resources from SRS Resource Set 1 based on Index Group 1, to constitute one SRS resource group, and determines two SRS resources from SRS Resource Set 2 based on Index Group 2, to constitute another SRS resource group. The SRS resource index groups corresponding to different SRI values may be agreed in a protocol, or may be informed to the terminal device by the network device through higher layer signaling in advance.

Method 2: The SRI indicates respective resource IDs of SRS resources which are included in each resource group in N SRS resource groups (the resource IDs are corresponding to higher layer parameter SRS-ResourceIds, that is, the SRI indicates N groups of SRS-ResourceIds), and the terminal device may directly determine an SRS resource included in each SRS resource group, from the higher layer parameters. The N groups of SRS resource IDs corresponding to each SRI value in the SRI indication field are preconfigured to the terminal device by the network device through higher layer signaling. For example, assuming N=2, then each SRI value may indicate {SRS Resource ID Set 1 configured by higher layer, SRS Resource ID Set 2 configured by higher layer}. Each SRS resource configured by RRC has a dedicated SRS resource ID SRS-ResourceId. The SRS resource ID indicated by the SRI should be included in the N SRS resource sets; otherwise the terminal device may consider it as an incorrect configuration and does not perform the corresponding PUSCH transmission.

For non-codebook-based PUSCH transmission, the N SRS resource sets include the same number of SRS resources.

6. The terminal device determines the transmission parameters of the N PUSCHs respectively, based on the N SRS resource groups, where each SRS resource group in the N SRS resource groups is corresponding to one PUSCH in the N PUSCHs, that is, the N SRS resource groups are in a one-to-one corresponding relationship with the N PUSCHs. The transmission parameter includes at least one of a number of transmission layer, a precoding matrix, a transmit beam, a power control parameter, and an antenna panel used for PUSCH transmission.

The terminal device determining the transmission parameters of the N PUSCHs respectively based on the N SRS resource groups, may be as the following.

For example, the terminal device may determine the number L of the SRS resources which are included in each SRS resource group in the N SRS resource groups, as the number of transmission layer (which is also referred to as a Rank) of a corresponding PUSCH.

For another example, the terminal device takes a precoding matrix and a transmit beam used for sending an SRS signal on the N SRS resources, as the transmit beam used for transmitting the N PUSCHs, where each SRS resource in one SRS resource group is in a one-to-one relationship with each transmission layer in the corresponding PUSCH. Specifically, the terminal takes a precoding matrix and a transmit beam used for sending an SRS signal on the $m^{th}$ SRS resource in the $k^{th}$ SRS resource group, as the precoding matrix and the transmit beam used for transmitting the $m^{th}$ transmission layer on the $k^{th}$ PUSCH. The transmit beam herein is also referred to as a spatial domain transmission filter.

For another example, the terminal device determines an antenna panel used for sending an SRS signal on the N SRS resource groups, as the antenna panel used for transmitting the N PUSCHs. Specifically, the terminal determines an antenna panel used for sending an SRS signal on the $k^{th}$ SRS resource group, as the antenna panel used for transmitting the $k^{th}$ PUSCH.

In addition, the terminal device may determine the power control parameters of the N PUSCHs, based on the PUSCH power control parameters which are respectively corresponding to the N SRS resource groups, specifically, the following methods may be used.

Method 1: The network device preconfigures a power control parameter corresponding to each SRS resource group in the N SRS resource groups through higher layer signaling, and the terminal device determines a PUSCH power control parameter corresponding to each SRS resource group, as a power control parameter of a corresponding PUSCH, so as to obtain respective power control parameters of N PUSCHs. Specifically, when the network device configures a PUSCH power control parameter through a SRI-PUSCH-PowerControl, each SRI-PUSCH-PowerControl includes N groups of PUSCH power control parameters, and each SRS resource group indicated by the SRI is corresponding to one group of PUSCH power control parameters. The terminal device determines the respective PUSCH power control parameters of the N PUSCHs, based on the PUSCH power control parameter corresponding to each SRS resource group in the N SRS resource groups. Specifically, the SRI-PUSCH-PowerControlId corresponding to the $k^{th}$ SRS resource group indicated by the SRI is equal to the $k^{th}$ group of power control parameters in the SRI-PUSCH-PowerControl of the SRI value.

Method 2: The network device preconfigures a PUSCH power control parameter corresponding to each SRS resource set in the N SRS resource sets through higher layer signaling, and the terminal device determines the PUSCH power control parameter corresponding to the SRI from the PUSCH power control parameter corresponding to the SRS resource set where each SRS resource group is located, as the power control parameter of the PUSCH corresponding the SRS resource. The network device configuring a PUSCH power control parameter corresponding to each SRS resource set in the N SRS resource sets may include the following configuration modes.

1) When the network device configures a PUSCH power control parameter through a SRI-PUSCH-PowerControl, each SRI-PUSCH-PowerControl includes one SRS resource set ID (high layer parameter SRS-ResourceId), indicating that the SRI-PUSCH-PowerControl is corresponding to the SRS resource set. The terminal device determines a set ID based on an SRS resource set where each SRS resource group in the N SRS resource groups is located, and based on the set ID and the SRI, the terminal device finds an SRI-PUSCH-PowerControl which includes the set ID and of which the corresponding SRI-PUSCH-PowerControlId is equal to the SRI value, as the power control parameter of the PUSCH corresponding to the SRS resource group. N PUSCHs may be corresponding to N different SRI-PUSCH-PowerControls.

2) Configuration Mode 2: When the network device configures a PUSCH power control parameter through a SRI-PUSCH-PowerControl, K groups of power control parameter SRI-PUSCH-PowerControls are configured for each SRS resource set, including PUSCH power control parameters which are respectively corresponding to K SRI values supported by the SRS resource set. The terminal device determines corresponding K groups of power control parameters based on an SRS resource set where each SRS resource group in the N SRS resource groups is located, and determines the power control parameter corresponding to the SRS resource group from the K groups of power control parameters based on the indicated SRI, so as to obtain respective power control parameters corresponding to N PUSCHs. N PUSCHs may be corresponding to N different SRI-PUSCH-PowerControls.

7. The terminal device sends the N PUSCHs based on the scheduling information in the DCI and the determined transmission parameters. The N PUSCH transmissions may carry same data information.

Specifically, the N PUSCHs are transmitted based on same scheduling information in the DCI, for example, using the same number of transmission layer, the same MCS and the same HARQ process to transmit the PUSCH. The N PUSCHs are transmitted based on the transmission parameters which are respectively determined by the N SRS resource groups, for example, the $k^{th}$ PUSCH transmission is transmitted based on the transmission parameter determined by the $k^{th}$ SRS resource group in the N SRS resource groups.

The terminal device obtains an uplink transmission power based on the determined power control parameter, so as to transmit the N PUSCHs. If the terminal device determines N groups of power control parameters based on N SRS resource groups, transmission powers are determined respectively based on these N groups of power control parameters, so as to send N PUSCHs (that is, transmission powers of N PUSCHs may be different). If the terminal device only determines one group of power control parameter, the N PUSCHs use a same transmission power. Specifically, the N PUSCHs are respectively transmitted in a same slot by using different panels.

Figure 11:
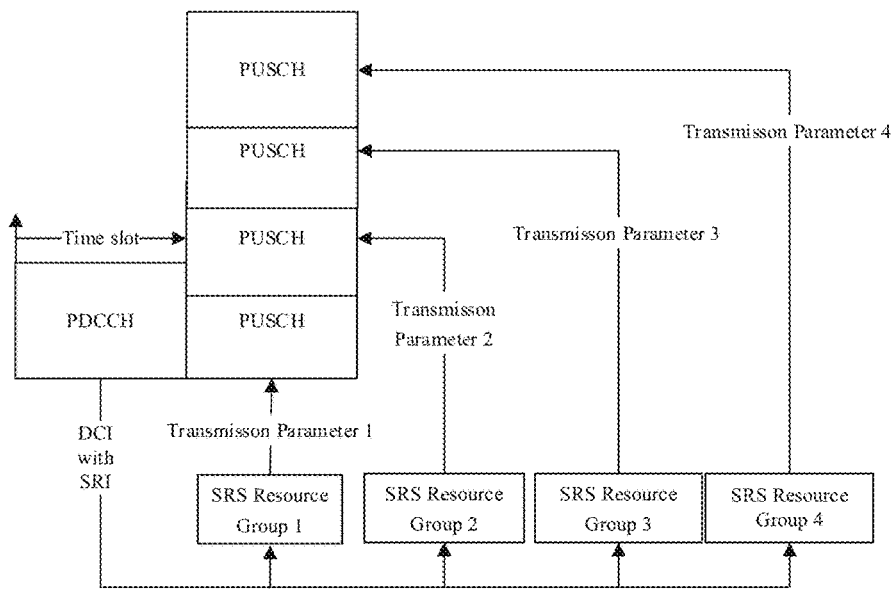
FIG. 11 is a schematic diagram corresponding to a third embodiment.

The schematic diagram of the third embodiment is shown in FIG. 11, where N=4, SRS Resource Group 1, SRS Resource Group 2, SRS Resource Group 3, and SRS Resource Group 4 are determined based on the SRI in the DCI carried by the PDCCH. And based on the 4 SRS resources, Transmission Parameter 1, Transmission Parameter 2, Transmission Parameter 3, and Transmission Parameter 4 of the PUSCH are respectively determined, which are respectively applied to the PUSCH scheduled by the DCI and transmitted in different frequency domains in a same slot.

Based on the method of third embodiment, when the terminal device performs PUSCH repeat transmission on a plurality of antenna panels, SRS resource groups in different SRS resource sets may be used for determining the used transmission parameters (one SRS resource set may be corresponding to one antenna panel), so that different precoding matrixes, beams, antenna panels or transmission powers may be used for repeat transmission of same data, which improves the reliability of PUSCH transmission.

It should be understood that in the various embodiments of the present disclosure, the size of the serial numbers of the above-mentioned processes does not mean the order of execution. The execution order of each process should be determined by its function and internal logic, and should not constitute any limitation on the implementation process of the embodiments of the present disclosure.

The method for transmitting a signal according to the embodiment of the present disclosure has been described in detail above. Thee apparatus for transmitting a signal according to the embodiment of the present disclosure will be described below in conjunction with FIG. 12 to FIG. 15, and the technical features described in the method embodiment are applicable to the following apparatus embodiment.

Figure 12:
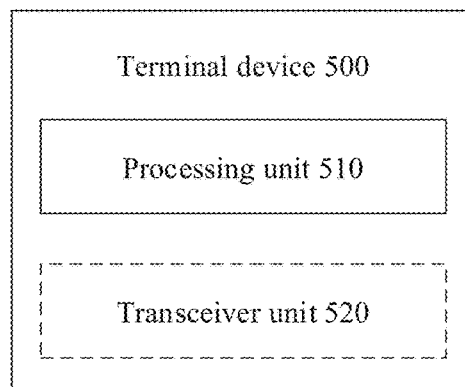
FIG. 12 is a schematic block diagram of a terminal device provided by the embodiment of the present disclosure.

FIG. 12 illustrates a schematic block diagram of a terminal device 500 according to the embodiment of the present disclosure. As shown in FIG. 12, the terminal device 500 includes a processing unit 510, configured to determine a plurality of Sounding Reference Signal (SRS) resources or a plurality of SRS resource groups based on a Sounding Reference Signal Resource Indicator (SRI) in scheduling information, where the scheduling information is used for scheduling a plurality of Physical Uplink Shared Channels (PUSCH), and the plurality of SRS resources or the plurality of SRS resource groups are corresponding to the plurality of PUSCHs; and determine transmission parameters of the plurality of PUSCHs based on the plurality of SRS resources or the plurality of SRS resource groups.

Optionally, in the embodiment of the present disclosure, the terminal device further includes a transceiver unit 520, configured to receive configuration information, where the configuration information is used for indicating at least one SRS resource set, and the plurality of SRS resources or the plurality of SRS resource groups belong to the at least one SRS resource set.

Optionally, in the embodiment of the present disclosure, the at least one SRS resource set includes a plurality of SRS resource sets, and the plurality of SRS resources or the plurality of SRS resource groups belong to different SRS resource sets in the plurality of SRS resource sets.

Optionally, in the embodiment of the present disclosure, the SRI includes an index of each SRS resource in the plurality of SRS resources in an SRS resource set to which each SRS resource belongs, and the processing unit is specifically configured to determine the plurality of SRS resources from the at least one SRS resource set based on the indexes of the SRS resources which are included in the SRI.

Optionally, in the embodiment of the present disclosure, the SRI includes a plurality of index groups, and each index group in the plurality of index groups includes indexes of SRS resources in one SRS resource group of the plurality of SRS resource groups in an SRS resource set to which the SRS resource belongs, and the processing unit is specifically configured to determine the plurality of SRS resource groups from the at least one SRS resource set based on the plurality of index groups which are included in the SRI.

Optionally, in the embodiment of the present disclosure, the SRI includes a resource Identity (ID) of each SRS resource in the plurality of SRS resources, and the processing unit is specifically configured to determine the plurality of SRS resources based on the resource IDs which are included in the SRI.

Optionally, in the embodiment of the present disclosure, the SRI includes a plurality of resource Identity (ID) sets, and each resource ID set in the plurality of resource ID sets includes a resource ID of an SRS resource in one SRS resource group of the plurality of SRS resource groups, and the processing unit is specifically configured to determine the plurality of SRS resource groups based on the plurality of resource ID sets which are included in the SRI.

Optionally, in the embodiment of the present disclosure, the processing unit is specifically configured to if the plurality of PUSCHs are codebook-based PUSCH transmission, determine the plurality of SRS resources based on the SRI; or if the plurality of PUSCHs are non-codebook-based PUSCH transmission, determine the plurality of SRS resource groups based on the SRI.

Optionally, in the embodiment of the present disclosure, the transmission parameter includes at least one of a number of transmission layer, a precoding matrix, a number of antenna port, a transmit beam, a power control parameter, and an antenna panel.

Optionally, in the embodiment of the present disclosure, the processing unit is specifically configured to determine a precoding matrix used for transmitting an SRS on each SRS resource in the plurality of SRS resources or each SRS resource group in the plurality of SRS resource groups, as a precoding matrix used for transmitting a PUSCH corresponding to the SRS resource or the SRS resource group; and/or determine a transmit beam used for transmitting an SRS on each SRS resource in the plurality of SRS resources or each SRS resource group in the plurality of SRS resource groups, as a transmit beam used for transmitting a PUSCH corresponding to the SRS resource or the SRS resource group; and/or determine an antenna panel used for transmitting an SRS on each SRS resource in the plurality of SRS resources or each SRS resource group in the plurality of SRS resource groups, as an antenna panel used for transmitting a PUSCH corresponding to the SRS resource or the SRS resource group; and/or determine, based on a power control parameter corresponding to each SRS resource in the plurality of SRS resources or each SRS resource group in the plurality of SRS resource groups, a power control parameter of a PUSCH corresponding to the SRS resource or the SRS resource group.

Optionally, in the embodiment of the present disclosure, the processing unit is specifically configured to determine a number of resources included in each SRS resource group in the plurality of SRS resource groups as a number of transmission layer of a PUSCH corresponding to the SRS resource group; or determine, based on a number of ports of each SRS resource in the plurality of SRS resources, and a Precoding Matrix Indicator (PMI) included in the scheduling information, a precoding matrix used by a PUSCH corresponding to the SRS resource.

Optionally, in the embodiment of the present disclosure, the processing unit is specifically configured to determine a PUSCH power control parameter corresponding to each SRS resource or each SRS resource group, as the power control parameter of the corresponding PUSCH; or determine a power control parameter of a PUSCH corresponding to each SRS resource from a PUSCH power control parameter which is corresponding to an SRS resource set to which each SRS resource belongs, based on an index of each SRS resource or the SRI; or determine a power control parameter of a PUSCH corresponding to each SRS resource group from a PUSCH power control parameter which is corresponding to an SRS resource set to which each SRS resource group belongs, based on the index of each SRS resource group or the SRI.

Optionally, in the embodiment of the present disclosure, a corresponding relationship between the plurality of SRS resources or the plurality of SRS resource groups and the plurality of PUSCHs is predefined by a specification, or determined based on a redundancy version in the plurality of PUSCHs, or configured by the network device through higher layer signaling.

Optionally, in the embodiment of the present disclosure, the plurality of SRS resources have a same number of ports, or the plurality of SRS resource groups includes a same number of SRS resources.

Optionally, in the embodiment of the present disclosure, each SRS resource in the plurality of SRS resources is corresponding to one Transmitting Point (TRP) or one antenna panel, or each SRS resource group in the plurality of SRS resource groups is corresponding to one TRP or one antenna panel.

Optionally, in the embodiment of the present disclosure, the plurality of PUSCHs are transmitted in consecutive slots or consecutive PUSCH transmission opportunities respectively, or the plurality of PUSCHs are transmitted in a same time slot.

Optionally, in the embodiment of the present disclosure, the plurality of PUSCHs are transmitted on different antenna panels respectively.

Optionally, in the embodiment of the present disclosure, the plurality of PUSCHs carry same data information.

Optionally, in the embodiment of the present disclosure, the scheduling information is carried in Downlink Control Information (DCI) or Radio Resource Control (RRC) signaling.

It should be understood that the terminal device 500 according to the embodiment of the present disclosure may correspond to the terminal device in the method embodiment of the present disclosure, and the above and other operations and/or functions of each unit in the terminal device 500 are for implementing the corresponding process in the methods of FIG. 7 and FIG. 9, which will not be described again for brevity.

Figure 13:
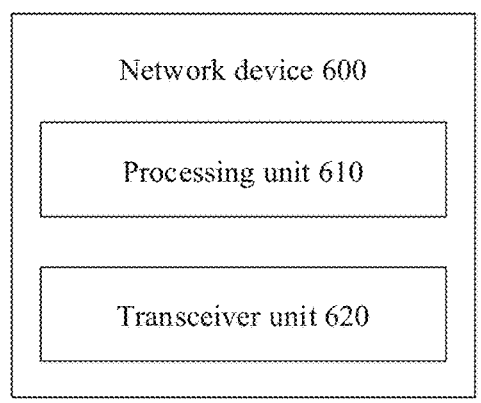
FIG. 13 is a schematic block diagram of a network device provided by the embodiment of the present disclosure.

FIG. 13 illustrates a schematic block diagram of a network device 600 according to the embodiment of the present disclosure. As shown in FIG. 13, the network device 600 includes a processing unit 610, configured to determine scheduling information based on a plurality of Sounding Reference Signal (SRS) resources or a plurality of SRS resource groups, where the scheduling information is used for scheduling a plurality of Physical Uplink Shared Channels (PUSCH), and the plurality of PUSCHs are corresponding to the plurality of SRS resources or the plurality of SRS resource groups; and a transceiver unit 620, configured to send the scheduling information to a terminal device, where a Sounding Reference Signal Indicator (SRI) in the scheduling information is used for indicating the plurality of SRS resources or the plurality of SRS resource groups.

Optionally, in the embodiment of the present disclosure, the transceiver unit is specifically configured to receive an SRS on at least one SRS resource set; and the processing unit is specifically configured to determine the plurality of SRS resources or the plurality of SRS resource groups from at least one SRS resource set.

Optionally, in the embodiment of the present disclosure, the transceiver unit is further configured to send configuration information to the terminal, where the configuration information is used for indicating the at least one SRS resource set.

Optionally, in the embodiment of the present disclosure, the at least one SRS resource set includes a plurality of SRS resource sets, and the plurality of SRS resources or the plurality of SRS resource groups belong to different SRS resource sets in the plurality of SRS resource sets.

Optionally, in the embodiment of the present disclosure, the SRI includes an index of each SRS resource in the plurality of SRS resources in an SRS resource set to which said each SRS resource belongs, or the SRI includes a plurality of index groups, where each index group in the plurality of index groups includes indexes of SRS resources in one SRS resource group of the plurality of SRS resource groups in an SRS resource set to which the SRS resource belongs.

Optionally, in the embodiment of the present disclosure, the SRI includes a resource Identity (ID) of each SRS resource in the plurality of SRS resources, or the SRI includes a plurality of resource Identity (ID) sets, where each resource ID set in the plurality of resource ID sets includes a resource ID of an SRS resource in one SRS resource group of the plurality of SRS resource groups.

Optionally, in the embodiment of the present disclosure, the transceiver unit is further configured to indicate to the terminal device a corresponding relationship between the plurality of SRS resources or the plurality of SRS resource groups and the plurality of PUSCHs.

Optionally, in the embodiment of the present disclosure, the plurality of SRS resources have a same number of ports, or the plurality of SRS resource groups include a same number of SRS resources.

Optionally, in the embodiment of the present disclosure, each SRS resource in the plurality of SRS resources is corresponding to one Transmitting Point (TRP) or one antenna panel, or each SRS resource group in the plurality of SRS resource groups is corresponding to one TRP or one antenna panel.

Optionally, in the embodiment of the present disclosure, the plurality of PUSCHs are transmitted in consecutive slots or consecutive PUSCH transmission opportunities respectively, or the plurality of PUSCHs are transmitted in a same slot.

Optionally, in the embodiment of the present disclosure, the plurality of PUSCHs carry same data information.

Optionally, in the embodiment of the present disclosure, the scheduling information further includes at least one of a frequency domain resource, a Rank Indicator (RI), a Precoding Matrix Indicator (PMI) and a Modulation and Coding Scheme (MCS) which are scheduled.

Optionally, in the embodiment of the present disclosure, the scheduling information is carried in Downlink Control Information (DCI) or Radio Resource Control (RRC) signaling.

It should be understood that the network device 600 according to the embodiment of the present disclosure may correspond to the network device in the method embodiment of the present disclosure, and the above and other operations and/or functions of each unit in the network device 600 are for implementing the corresponding process in the methods of FIG. 7 and FIG. 9, which will not be described again for brevity.

Figure 14:
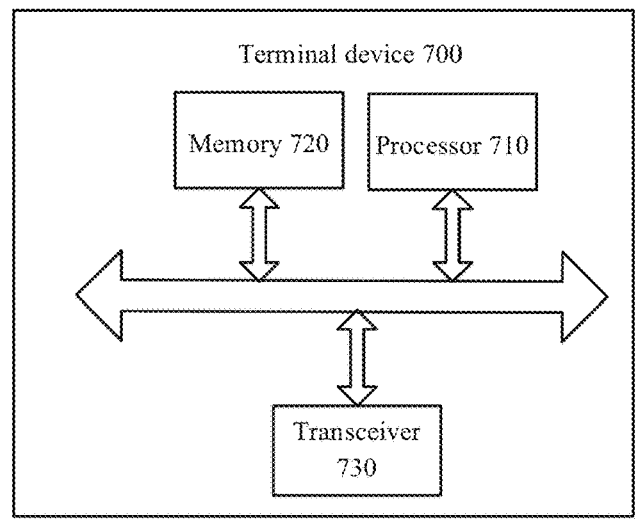
FIG. 14 is another schematic block diagram of the terminal device provided by the embodiment of the present disclosure.

As shown in FIG. 14, the embodiment of the present disclosure also provides a terminal device 700, which may be the terminal device 700 in FIG. 12, and may be used for performing the contents of the terminal devices corresponding to the methods in FIG. 7 and FIG. 9. The terminal device 700 shown in FIG. 14 includes a processor 710, which may call and run a computer program from a memory to implement the method in the embodiment of the present disclosure.

Optionally, as shown in FIG. 14, the terminal device 700 may also include a memory 720. The processor 710 may call and run a computer program from the memory 720 to implement the method in the embodiment of the present disclosure.

The memory 720 may be a separate component independent of the processor 710, or may be integrated in the processor 710.

Optionally, as shown in FIG. 14, the terminal device 700 may also include a transceiver 730, and the processor 710 may control the transceiver 730 to communicate with other devices, specifically, may send information or data to other devices, or receive information or data sent by other devices.

The transceiver 730 may include a transmitter and a receiver. The transceiver 730 may further include an antenna, and a number of antennas may be one or more.

Optionally, the terminal device 700 may be the terminal device in the embodiment of the present disclosure, and the terminal device 700 may implement the corresponding process implemented by the terminal device in each method of the embodiment of the present disclosure, which will not be described again for brevity.

In a specific embodiment, the transceiver unit in the terminal device 500 may be implemented by the transceiver 730 in FIG. 14. The processing unit in the terminal device 500 may be implemented by the processor 710 in FIG. 14.

Figure 15:
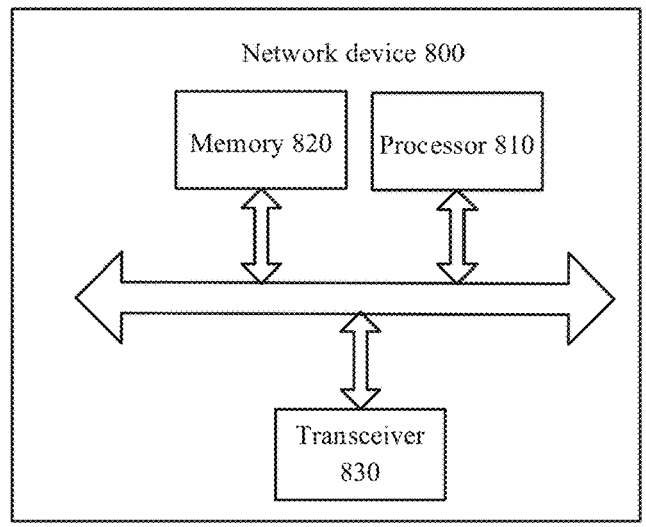
FIG. 15 is another schematic block diagram of the network device provided by the embodiment of the present disclosure.

As shown in FIG. 15, the embodiment of the present disclosure also provides a network device 800, which may be the network device 600 in FIG. 13, and may be used for performing the contents of the network devices corresponding to the methods in FIG. 8 and FIG. 9. The network device 800 shown in FIG. 15 includes a processor 810, which may call and run a computer program from a memory to implement the method in the embodiment of the present disclosure.

Optionally, as shown in FIG. 15, the network device 800 may also include a memory 820. The processor 810 may call and run a computer program from the memory 820 to implement the method in the embodiment of the present disclosure.

The memory 820 may be a separate component independent of the processor 810, or may be integrated in the processor 810.

Optionally, as shown in FIG. 15, the network device 800 may also include a transceiver 830, and the processor 810 may control the transceiver 830 to communicate with other devices, specifically, may send information or data to other devices, or receive information or data sent by other devices.

The transceiver 830 may include a transmitter and a receiver. The transceiver 830 may further include an antenna, and a number of antennas may be one or more.

Optionally, the network device 800 may be the network device in the embodiment of the present disclosure, and the network device 800 may implement the corresponding process implemented by the network device in each method of the embodiment of the present disclosure, which will not be described again for brevity.

In a specific embodiment, the processing unit in the network device 600 may be implemented by the processor 810 in FIG. 15. The transceiver unit in the network device 600 may be implemented by the transceiver 830 in FIG. 15.

Figure 16:
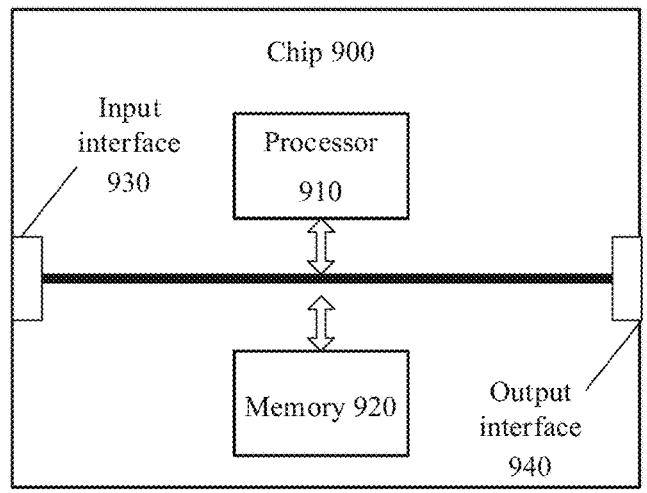
FIG. 16 is a schematic block diagram of a chip provided by the embodiment of the present disclosure.

FIG. 16 is a schematic block diagram of a chip according to the embodiment of the present disclosure. The chip 900 as shown in FIG. 16 includes a processor 910, which may call and run a computer program from a memory to implement the method in the embodiment of the present disclosure.

Optionally, as shown in FIG. 16, the chip 900 may further include a memory 920. The processor 910 may call and run a computer program from the memory 920 to implement the method in the embodiment of the present disclosure.

The memory 920 may be a separate component independent of the processor 910, or may be integrated in the processor 910.

Optionally, the chip 900 may further include an input interface 930. The processor 910 may control the input interface 930 to communicate with other devices or chips, specifically, may obtain information or data sent by other devices or chips.

Optionally, the chip 900 may further include an output interface 940. The processor 910 may control the output interface 940 to communicate with other devices or chips, specifically, may output information or data to other devices or chips.

Optionally, the chip may be applied to the network device in the embodiment of the present disclosure, and the chip may implement the corresponding process implemented by the network device in each method of the embodiment of the present disclosure, which will not be described again for brevity.

Optionally, the chip may be applied to the terminal device in the embodiment of the present disclosure, and the chip may implement the corresponding process implemented by the terminal device in each method of the embodiment of the present disclosure, which will not be described again for brevity.

It should be understood that the chip mentioned in the embodiment of the present disclosure may also be referred to as a system-level chip, a system chip, a chip system, or a system-on-chip chip, etc.

Figure 17:
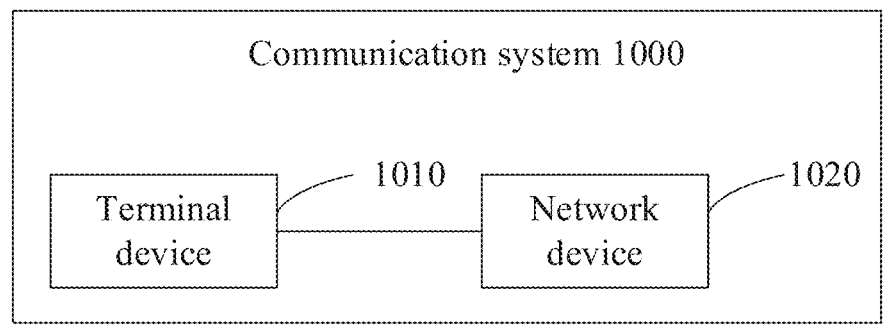
FIG. 17 is a schematic block diagram of a communication system provided by the embodiment of the present disclosure.

FIG. 17 is a schematic block diagram of a communication system 1000 provided by the embodiments of the present disclosure. As shown in FIG. 17, the communication system 1000 includes a terminal device 1010 and a network device 1020.

The terminal device 1010 may be used for implementing the corresponding function implemented by the terminal device in the above method, and the network device 1020 may be used for implementing the corresponding function implemented by the network device in the above method, which will not be described again for brevity.

It should be understood that the terms "system" and "network" are often used interchangeably herein. The term "and/or" herein is only to describe a kind of association relationship among associated objects, and means that there may be three kinds of relationships. For example, A and/or B may mean that there are the following three cases: A exists alone, A and B exist at the same time, and B exists alone. In addition, the character "/" herein generally indicates that the associated objects are in an "or" relationship.

It should be understood that the processor of the embodiments of the present disclosure may be an integrated circuit chip with signal processing capability. In the implementation process, each step of the above method embodiments may be completed by hard ware integrated logic circuits in the processor or instructions in the form of software. The above processor may be a general-purpose processor, a digital signal processor (DSP), an application specific integrated circuit (ASIC), a field programmable gate array (FPGA) or other programmable logic parts, discrete gates or transistor logic parts, discrete hardware components. Each method, step and logic block diagram disclosed in the embodiments of the present disclosure may be implemented or executed. The general-purpose processor may be a microprocessor, or the processor may also be any conventional processor or the like. The steps of the method disclosed in combination with the embodiments of the present disclosure may be directly reflected as the execution by a hardware decoding processor, or by a combination of hardware and software modules in the decoding processor. The software module may be located in a mature storage medium of the art, such as a random access memory, a flash memory, a read-only memory, a programmable read-only memory or an electrically erasable programmable memory, a register, etc. The storage medium is located in the memory, and the processor reads information in the memory and completes the steps of the above method in combination with its hardware.

It can be understood that the memory in the embodiments of the present disclosure may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The non-volatile memory may be a Random Access Memory (RAM) which serves as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synch link DRAM (SLDRAM) and a Direct Rambus RAM (DR RAM). It should be noted that the memories of the system and method described herein are intended to include, but are not limited to these and any other suitable types of memories.

It should be understood that the above memory is exemplary but not limited restrictive, for example, the memory of the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is to say, the memories of the embodiments of the present disclosure are intended to include, but are not limited to these and any other suitable types of memories.

The embodiment of the present disclosure also provides a computer-readable storage medium for storing computer programs.

Optionally, the computer-readable storage medium may be applied to the network device in the embodiments of the present disclosure, and the computer program enables the computer to execute the corresponding process implemented by the network device in each method of the embodiments of the present disclosure, which will not be described here again for brevity.

Optionally, the computer-readable storage medium may be applied to the terminal device in the embodiments of the present disclosure, and the computer program enables the computer to execute the corresponding process implemented by the mobile terminal/terminal device in each method of the embodiments of the present disclosure, which will not be described here again for brevity.

The embodiment of the present disclosure also provides a computer program product including computer program instructions.

Optionally, the computer program product may be applied to the network device in the embodiments of the present disclosure, and the computer program instruction enables the computer to execute the corresponding process implemented by the network device in each method of the embodiments of the present disclosure, which will not be described here again for brevity Optionally, the computer program product may be applied to the terminal device in the embodiments of the present disclosure, and the computer program instruction enables the computer to execute the corresponding process implemented by the mobile terminal/terminal device in each method of the embodiments of the present disclosure, which will not be described here again for brevity.

The embodiment of the present disclosure also provides a computer program.

Optionally, the computer program may be applied to the network device in the embodiments of the present disclosure, and when the computer program runs on the computer, the computer is caused to execute the corresponding process implemented by the network device in each method of the embodiments of the present disclosure, which will not be described here again for brevity.

Optionally, the computer program product may be applied to the terminal device in the embodiments of the present disclosure, and when the computer program runs on the computer, the computer program is caused to execute the corresponding process implemented by the terminal device in each method of the embodiments of the present disclosure, which will not be described here again for brevity.

Those of ordinary skill in the art can be aware that the unit and algorithm step of each example described in conjunction with the embodiments disclosed herein may be implemented by electronic hardware, or a combination of computer software and electronic hardware. Whether these functions are executed in the form of hardware or software depends on the specific application and design constraints of the technical solution. Professionals and technicians may use different methods for each specific application to implement the described function, but such implementation should not be considered beyond the scope of the present disclosure.

Those skilled in the art can clearly understand that, for the convenience and conciseness of the description, the specific working process of the system, apparatus and unit described above may refer to the corresponding process in the aforementioned method embodiments, which will not be described here again.

In the several embodiments provided by the present disclosure, it should be understood that the disclosed system, apparatus and method may be implemented in other manners. For example, the apparatus embodiment described above is merely exemplary. For example, the division of the units is merely one kind of logical function division, and there may be other division manners in actual implementation. For example, multiple units or components may be combined or integrated in another system, or some features may be ignored or not executed. On the other hand, the mutual coupling or direct coupling or communication connection shown or discussed may be indirect coupling or communication connection through some interfaces, apparatus or units, and may be in electrical, mechanical or other forms.

The unit described as a separate component may or may not be physically separated, and the component displayed as a unit may or may not be a physical unit, that is, it may be located in one place, or may be distributed on multiple network units. Some or all of the units may be selected according to actual needs to achieve the objectives of the solutions of the embodiments.

In addition, each functional unit in each embodiment of the present disclosure may be integrated in one processing unit, or each unit may exist alone physically, or two or more above units may be integrated in one unit.

The functions may also be stored in a computer-readable storage medium if being implemented in the form of a software functional unit and sold or used as an independent product. Based on such understanding, the essence of the technical solution of the present disclosure or the part contributing to the prior art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present disclosure. The aforementioned storage medium includes a U disk, a mobile hard disk, a read-only memory (ROM), a random access memory (RAM), a magnetic disk or an optical disk and other mediums that can store program codes.

The foregoing descriptions are merely specific implementations of the embodiments of the present disclosure, and the protection scope of the embodiments of the present disclosure is not limited thereto. Any person skilled in the art can easily think of changes or substitutions within the technical scope disclosed in the present disclosure, and all the changes or substitutions should be covered in the protection scope of the present disclosure. Therefore, the protection scope of the present disclosure should be subject to the protection scope of the claims.

What is claimed is:

1. A method for transmitting a signal, comprising:
    determining, by a terminal device, a plurality of Sounding Reference Signal (SRS) resources or a plurality of SRS resource groups based on a Sounding Reference Signal Resource Indicator (SRI) in scheduling information, wherein the scheduling information is used for scheduling a plurality of Physical Uplink Shared Channels (PUSCH), and the plurality of SRS resources or the plurality of SRS resource groups are corresponding to the plurality of PUSCHs;
    determining, by the terminal device, transmission parameters of the plurality of PUSCHs based on the plurality of SRS resources or the plurality of SRS resource groups; and
    receiving, by the terminal device, configuration information, wherein the configuration information is used for indicating a plurality of SRS resource sets, and the plurality of SRS resources or the plurality of SRS resource groups belong to different SRS resource sets in the plurality of SRS resource sets, wherein the SRI comprises a plurality of index groups, and each index group in the plurality of index groups comprises indexes of SRS resources in one SRS resource group of the plurality of SRS resource groups in an SRS resource set to which said SRS resource belongs, and determining, by the terminal device, the plurality of SRS resource groups based on the SRI, comprises:

determining, by the terminal device, the plurality of SRS resource groups from at least one SRS resource set based on the plurality of index groups which are comprised in the SRI.

2. The method according to claim 1, wherein the SRI comprises an index of each SRS resource in the plurality of SRS resources in an SRS resource set to which said each SRS resource belongs, and determining, by the terminal device, the plurality of SRS resources based on the SRI comprises:

determining, by the terminal device, the plurality of SRS resources from the at least one SRS resource set based on the indexes of the SRS resources which are comprised in the SRI.

3. The method according to claim 1, wherein determining, by the terminal device, a plurality of SRS resources or a plurality of SRS resource groups based on the SRI, comprises:

when the plurality of PUSCHs are codebook-based PUSCH transmission, determining, by the terminal device, the plurality of SRS resources based on the SRI; or when the plurality of PUSCHs are non-codebook-based PUSCH transmission, determining, by the terminal device, the plurality of SRS resource groups based on the SRI.

4. The method according to claim 1, wherein the transmission parameter comprises at least one of a number of transmission layer, a precoding matrix, a number of antenna port, a transmit beam, a power control parameter, and an antenna panel.

5. The method according to claim 1, wherein determining, by the terminal device, transmission parameters of the plurality of PUSCHs based on the plurality of SRS resources or the plurality of SRS resource groups, comprises at least one of:

determining, by the terminal device, a precoding matrix used for transmitting an SRS on each SRS resource in the plurality of SRS resources or each SRS resource group in the plurality of SRS resource groups, as a precoding matrix used for transmitting a PUSCH corresponding to said SRS resource or said SRS resource group;

determining, by the terminal device, a transmit beam used for transmitting an SRS on each SRS resource in the plurality of SRS resources or each SRS resource group in the plurality of SRS resource groups, as a transmit beam used for transmitting a PUSCH corresponding to said SRS resource or said SRS resource group;

determining, by the terminal device, an antenna panel used for transmitting an SRS on each SRS resource in the plurality of SRS resources or each SRS resource group in the plurality of SRS resource groups, as an antenna panel used for transmitting a PUSCH corresponding to said SRS resource or said SRS resource group; or determining, by the terminal device, based on a power control parameter corresponding to each SRS resource in the plurality of SRS resources or each SRS resource group in the plurality of SRS resource groups, a power control parameter of a PUSCH corresponding to said SRS resource or said SRS resource group.

6. The method according to claim 5, wherein determining, by the terminal device, based on a power control parameter corresponding to each SRS resource in the plurality of SRS resources or each SRS resource group in the plurality of SRS resource groups, a power control parameter of a PUSCH corresponding to said SRS resource or said SRS resource group, comprises:

determining, by the terminal device, a PUSCH power control parameter corresponding to said each SRS resource or said each SRS resource group, as the power control parameter of the PUSCH corresponding to said SRS resource or said SRS resource group;

determining, by the terminal device, based on an index of said each SRS resource or the SRI, a power control parameter of a PUSCH corresponding to said each SRS resource from a PUSCH power control parameter which is corresponding to an SRS resource set to which said each SRS resource belongs; or determining, by the terminal device, based on the index of said each SRS resource group or the SRI, a power control parameter of a PUSCH corresponding to said each SRS resource group from a PUSCH power control parameter which is corresponding to an SRS resource set to which said each SRS resource group belongs.

7. The method according to claim 1, wherein determining, by the terminal device, transmission parameters of the plurality of PUSCHs based on the plurality of SRS resources or the plurality of SRS resource groups, comprises:

determining, by the terminal device, a number of resources comprised in each SRS resource group in the plurality of SRS resource groups as a number of transmission layer of a PUSCH corresponding to said SRS resource group; or determining, by the terminal device, based on a number of ports of each SRS resource in the plurality of SRS resources, and a Precoding Matrix Indicator (PMI) comprised in the scheduling information, a precoding matrix used by a PUSCH corresponding to the SRS resource.

8. The method according to claim 1, wherein a corresponding relationship between the plurality of SRS resources or the plurality of SRS resource groups and the plurality of PUSCHs is predefined by a specification, or determined based on a redundancy version of the plurality of PUSCHs, or configured by the network device through higher layer signaling.

9. The method according to claim 1, wherein the plurality of SRS resources have a same number of ports, or the plurality of SRS resource groups comprise a same number of SRS.

10. The method according to claim 1, wherein the plurality of PUSCHs are transmitted in consecutive slots or consecutive PUSCH transmission opportunities respectively, or the plurality of PUSCHs are transmitted in a same slot.

11. The method according to claim 1, wherein the plurality of PUSCHs carry same data information.

12. The method according to claim 1, wherein the scheduling information is carried in Downlink Control Information (DCI) or Radio Resource Control (RRC) signaling.

13. A terminal device, comprising:
a memory; and
a processor,
wherein the memory is configured to store a computer program, and the processor is configured to call and run the computer program stored in the memory to:
  determine a plurality of Sounding Reference Signal (SRS) resources or a plurality of SRS resource groups based on a Sounding Reference Signal Resource Indicator (SRI) in scheduling information, wherein the scheduling information is used for scheduling a plurality of Physical Uplink Shared Channels (PUSCH), and the plurality of SRS resources or the plurality of SRS resource groups are corresponding to the plurality of PUSCHs;
  determine transmission parameters of the plurality of PUSCHs based on the plurality of SRS resources or the plurality of SRS resource groups; and
  receive configuration information, wherein the configuration information is used for indicating a plurality of SRS resource sets, and the plurality of SRS resources or the plurality of SRS resource groups belong to different SRS resource sets in the plurality of SRS resource sets,
wherein the SRI comprises a plurality of index groups, and each index group in the plurality of index groups comprises indexes of SRS resources in one SRS resource group of the plurality of SRS resource groups in an SRS resource set to which said SRS resource belongs, and the processor is further configured to:
  determine the plurality of SRS resource groups from at least one SRS resource set based on the plurality of index groups which are comprised in the SRI.

14. The terminal device according to claim 13, wherein the SRI comprises an index of each SRS resource in the plurality of SRS resources in an SRS resource set to which said each SRS resource belongs, and the processor is further configured to:
  determine the plurality of SRS resources from the at least one SRS resource set based on the indexes of the SRS resources which are comprised in the SRI.

15. The terminal device according to claim 13, wherein the processor is further configured to:
  when the plurality of PUSCHs are codebook-based PUSCH transmission, determine the plurality of SRS resources based on the SRI; or
  when the plurality of PUSCHs are non-codebook-based PUSCH transmission, determine the plurality of SRS resource groups based on the SRI.

16. A network device, comprising:
a memory; and
a processor,
wherein the memory is configured to store a computer program, and the processor is configured to call and run the computer program stored in the memory to:
  determine scheduling information based on a plurality of Sounding Reference Signal (SRS) resources or a plurality of SRS resource groups, wherein the scheduling information is used for scheduling a plurality of Physical Uplink Shared Channels (PUSCH), and the plurality of PUSCHs are corresponding to the plurality of SRS resources or the plurality of SRS resource groups;
  send the scheduling information to a terminal device, wherein Sounding Reference Signal Indicator (SRI) in the scheduling information is used for indicating the plurality of SRS resources or the plurality of SRS resource groups; and
  send configuration information to the terminal device, wherein the configuration information is used for indicating a plurality of SRS resource sets, and the plurality of SRS resources or the plurality of SRS resource groups belong to different SRS resource sets in the plurality of SRS resource sets,
wherein the SRI comprises a plurality of index groups, and each index group in the plurality of index groups comprises indexes of SRS resources in one SRS resource group of the plurality of SRS resource groups in an SRS resource set to which said SRS resource belongs, and wherein the plurality of index groups which are comprised in the SRI are used by the terminal device for determining the plurality of SRS resource groups from at least one SRS resource set.

* * * * *